United States Patent
Roth et al.

(10) Patent No.: US 9,451,013 B1
(45) Date of Patent: Sep. 20, 2016

(54) PROVIDING INSTANCE AVAILABILITY INFORMATION

(71) Applicant: Amazon Technologies, Inc., Seattle, WA (US)

(72) Inventors: Gregory Branchek Roth, Seattle, WA (US); Christopher Richard Jacques de Kadt, Cape Town (ZA); James Alfred Gordon Greenfield, Cape Town (ZA); Randall Avery Shealey, Seattle, WA (US); Robin Alan Golden, Cape Town (ZA); Arjun Radhakrishnan, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 502 days.

(21) Appl. No.: 13/732,986

(22) Filed: Jan. 2, 2013

(51) Int. Cl.
    *H04L 29/08*      (2006.01)
    *H04L 12/911*      (2013.01)
    *H04L 12/917*      (2013.01)

(52) U.S. Cl.
    CPC .............. *H04L 67/10* (2013.01); *H04L 47/76* (2013.01); *H04L 47/78* (2013.01)

(58) Field of Classification Search
    CPC .............................. H04L 67/10; H04L 47/76
    See application file for complete search history.

(56) References Cited

U.S. PATENT DOCUMENTS

| | | | |
|---|---|---|---|
| 6,618,805 B1 * | 9/2003 | Kampe | G06F 11/1433 713/1 |
| 7,246,268 B2 | 7/2007 | Craig et al. | |
| 7,797,141 B2 * | 9/2010 | O'Connell | G06Q 10/04 702/186 |
| 7,861,122 B2 | 12/2010 | Cornwell et al. | |
| 7,917,810 B2 | 3/2011 | Piszczek et al. | |
| 8,122,185 B2 | 2/2012 | Merry, Jr. et al. | |
| 8,185,784 B2 | 5/2012 | McCombs et al. | |
| 8,316,263 B1 | 11/2012 | Gough et al. | |
| 8,495,648 B1 * | 7/2013 | Brandwine | G06F 9/606 709/226 |
| 8,650,298 B2 * | 2/2014 | Daly | G06F 9/505 709/226 |
| 8,656,002 B1 * | 2/2014 | Adogla | G06F 9/485 709/201 |
| 8,751,691 B1 * | 6/2014 | Brandwine | H04L 61/2521 709/238 |
| 8,775,282 B1 * | 7/2014 | Ward, Jr. | H04L 41/0896 705/34 |
| 8,850,419 B1 * | 9/2014 | Fitzgerald | G06F 8/65 717/168 |
| 8,924,542 B1 * | 12/2014 | Gabrielson | H04L 12/4641 709/224 |
| 9,009,334 B1 * | 4/2015 | Jenkins | G06F 21/55 709/203 |
| 9,032,077 B1 * | 5/2015 | Klein | H04L 29/08 370/395.21 |
| 9,055,067 B1 * | 6/2015 | Ward, Jr. | H04L 67/10 |
| 9,185,008 B1 | 11/2015 | Stickle et al. | |

(Continued)

OTHER PUBLICATIONS

Office Action dated Jan. 7, 2015 in U.S. Appl. No. 13/732,993, filed Jan. 2, 2013, first named inventor: Roth.

(Continued)

*Primary Examiner* — Lashonda Jacobs
(74) *Attorney, Agent, or Firm* — Lee & Hayes, PLLC

(57) ABSTRACT

A distributed execution environment provides instances of computing resources for customer use, such as instances of data processing resources, data storage resources, database resources, and networking resources. Data is collected from systems internal to and external to the distributed execution environment. Some or all of the data is utilized to compute instance availability information for instances of computing resources provided by the distributed execution environment. The instance availability information might then be provided to customers and other users of the distributed execution environment. Various types of actions might be taken in a manual or automated way based upon the computed instance availability information.

28 Claims, 11 Drawing Sheets

(56) References Cited

U.S. PATENT DOCUMENTS

| | | |
|---|---|---|
| 9,189,284 B2 | 11/2015 | Collins et al. |
| 9,208,032 B1 | 12/2015 | McAlister et al. |
| 2002/0120744 A1* | 8/2002 | Chellis .................. G06F 9/50 709/226 |
| 2002/0133593 A1* | 9/2002 | Johnson ............... G06Q 10/10 709/226 |
| 2005/0038801 A1* | 2/2005 | Colrain ............ G06F 17/30289 |
| 2005/0268299 A1* | 12/2005 | Picinich ............... G06F 9/485 718/100 |
| 2007/0061461 A1* | 3/2007 | Hicks .................. H04L 41/147 709/226 |
| 2007/0136534 A1* | 6/2007 | Mesard ............. G06F 9/30047 711/137 |
| 2008/0243993 A1* | 10/2008 | Wang ............... H04L 29/12113 709/203 |
| 2008/0244600 A1* | 10/2008 | Wong ................. G06F 9/5083 718/104 |
| 2009/0012963 A1* | 1/2009 | Johnson ............... G06F 9/5044 |
| 2009/0271472 A1* | 10/2009 | Scheifler ............... G06F 9/485 709/202 |
| 2010/0169477 A1* | 7/2010 | Stienhans ............ G06F 9/5083 709/224 |
| 2010/0318545 A1* | 12/2010 | Handy ............. G06F 17/30477 707/759 |
| 2011/0066898 A1* | 3/2011 | McRory ................ G06F 11/008 714/47.3 |
| 2012/0079505 A1* | 3/2012 | Tarta ................ H04L 29/08135 719/314 |
| 2012/0084443 A1* | 4/2012 | Theimer ............ G06F 9/45533 709/226 |
| 2012/0110582 A1* | 5/2012 | Ferdous ............. G06F 11/3442 718/101 |
| 2012/0278129 A1* | 11/2012 | Salomatin ............. G06Q 10/06 705/7.31 |
| 2014/0280965 A1* | 9/2014 | Steinder ................. G06F 9/505 709/226 |

OTHER PUBLICATIONS

Office Action for U.S. Appl. No. 13/732,993, mailed on Jun. 29, 2015, Gregory Branchek Roth, "Providing Instance Availability Information", 15 pages.

* cited by examiner

PROVIDING INSTANCE AVAILABILITY INFORMATION

BACKGROUND

Network-based services exist that allow customers to purchase and utilize instances of computing resources ("instances"), such as virtual machine instances, on a permanent or as-needed basis. In addition to virtual machine instances, these services typically allow customers to purchase and utilize instances of other types of computing resources for use with virtual machine instances. For example, customers might be permitted to purchase and utilize instances of data storage resources, instances of database resources, instances of networking resources, and instances of other types of resources. Utilizing instances of these various types, customers of such a service can create custom "solutions" that provide various types of functionality, such as application hosting, backup and storage, content delivery, World Wide Web ("Web") hosting, enterprise information technology ("IT") solutions, database services, and others.

It is not unusual for network-based services such as those described above to periodically experience hardware, software, or other types of system failures that result in the failure or unavailability of customer-operated instances. In typical network-based services, customers are not made aware of such failures until after a failure has occurred and the customer-operated instances have been negatively impacted in some way. This can be very frustrating to customers of such network-based services.

The disclosure made herein is presented with respect to these and other considerations.

DETAILED DESCRIPTION

Figure 1:
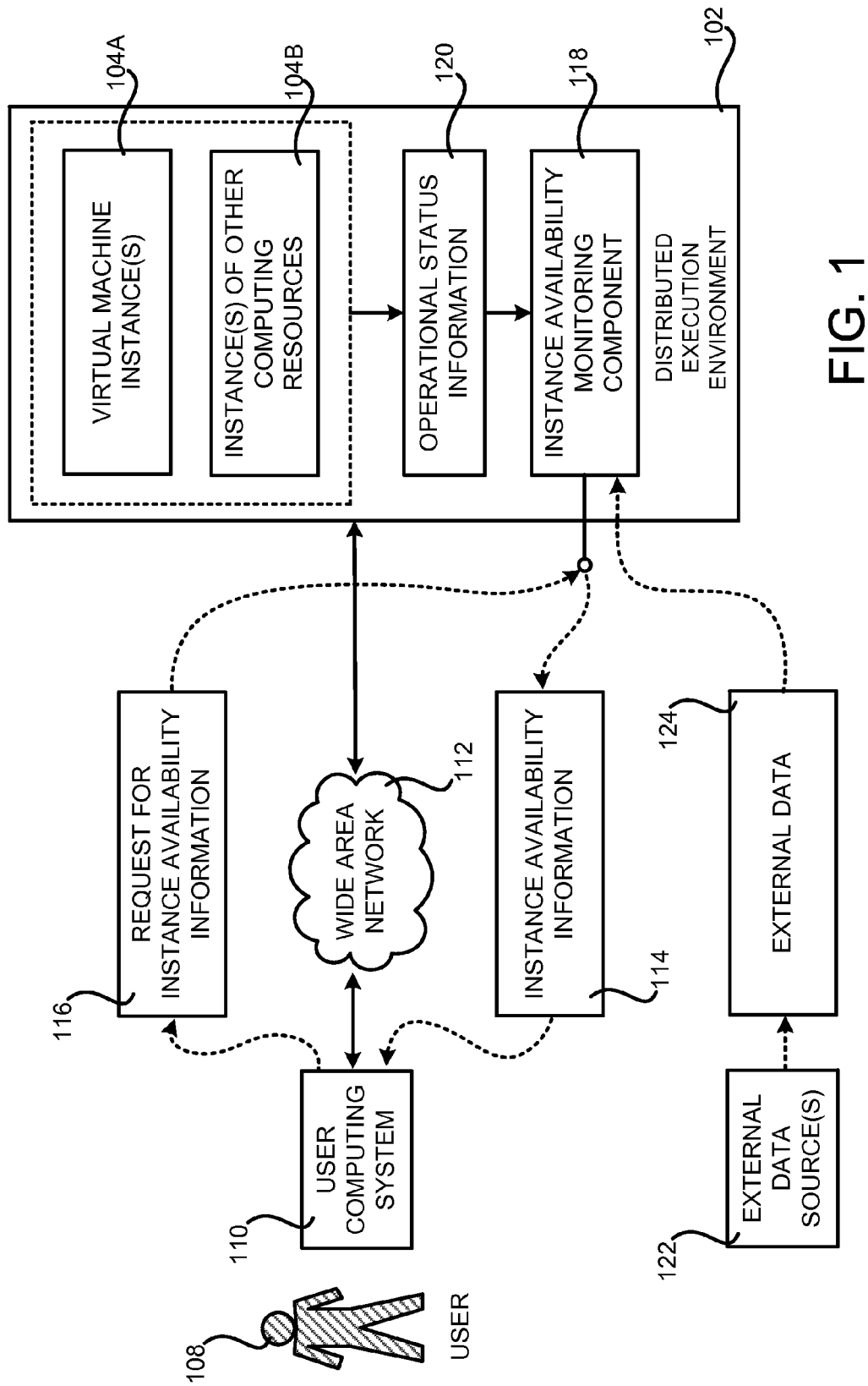
FIG. 1 is a computer system diagram providing an overview description of a mechanism disclosed herein for providing availability information for instances of computing resources provided by a distributed execution environment, according to one embodiment presented herein.

The following detailed description is directed to technologies for providing instance availability information. Utilizing the technologies described herein, instance availability information can be computed that describes the current actual availability of instances provided by a distributed execution environment and/or the probability that instances will be available at a future point in time. Utilizing this information, customers or other users of the distributed execution environment can take various types of actions, such as moving instances from a data center affected by an outage or predicted outage to a non-affected data center. The instance availability information might also be utilized in other ways described below.

According to one aspect presented herein, a computer-implemented mechanism is disclosed for providing instance availability information. In one implementation, the mechanism operates in conjunction with a network-based distributed execution environment in which customers can purchase, configure, and utilize instances of computing resources, such as virtual machine instances, data storage resources, networking resources, and database resources, on a permanent or as-needed basis. The distributed execution environment may offer instances of computing resources for purchase and use in various configurations. For example, the distributed execution environment might offer virtual machine instances available for purchase and use that have many different configurations of processor capabilities, main memory, disk storage, and operating system. As mentioned above, a customer might create, configure, and deploy various combinations of instances of computing resources to create "solutions" that provide various types of functionality, such as application hosting, backup and storage, content delivery, Web hosting, enterprise IT solutions, database services, and others.

In order to provide the functionality disclosed herein, the distributed execution environment, or one or more components operating in conjunction with the distributed execution environment, collects operational status information from components within the distributed execution environment that are utilized to provide instances of computing resources. For example, data describing the current operational state of various hardware components like server computers, networking devices, cooling systems, and power systems might be collected. Data describing the current operational state of various software components within the distributed execution environment might also be collected. Data might be collected from in-production components or from "canary" components configured to detect actual or potential problems within the distributed execution environment and to provide operational status information describing any detected issues. Data might also be collected from in-production components that also provide canary functionality.

Data might also be collected from an operator of the distributed execution environment. For example, data indicating the scheduled maintenance of software or hardware components in the distributed execution environment, the time at which maintenance was last performed on software or hardware components, information identifying the scheduled deployment of new software or firmware to components in the distributed execution environment, and other types of data that might be relevant to the current or future availability of instances of computing resources provided by the distributed execution environment might be collected.

In some implementations, data that may be relevant to a determination of a probability of a future failure of instances provided by the distributed execution environment is also collected from one or more sources external to the distributed execution environment. For example, weather forecasts might be obtained for a geographic area that includes a data center that provides the instances. Similarly, information might be collected from utility providers, such as power, gas, and data networking providers. This data might be indicative of a future failure of a utility provider and, therefore, might also be utilized to compute a future probability of a failure of instances provided by the distributed execution environment.

Instance availability information may be computed using some or all of the collected data. The computed instance availability information might identify actual current failures of instances of computing resources and the severity of the failures. The instance availability information might also provide a probability of the future availability of instances of computing resources. The instance availability information might be provided on a per customer basis, per instance basis, per data center basis, per region basis, or on another basis. For example, a customer might be provided with instance availability information indicating the probability of availability during a certain period of time for all of the instances that the customer has purchased. As another example, a customer might be provided with information describing the probability that a particular instance will be available during some future time period.

According to various embodiments, the instance availability information might be provided to customers of the distributed execution environment in real-time or in near real-time. In some embodiments, a delay might be imposed prior to provision of the instance availability information to users of the distributed execution environment. The instance availability information might be provided by way of a "pull" mechanism, such as a Web services application programming interface ("API"), or a "push" mechanism such as e-mail or short messaging system ("SMS") messages. Other mechanisms might also be utilized to provide the computed instance availability estimate to customers and other users of a distributed execution environment.

According to embodiments, various types of manual or automated actions might also be taken with regard to instances of computing resources based upon the computed instance availability information for the instances. For example, instances of computing resources might be migrated out of a data center affected by a failure and into a data center that is not affected by the failure. In other scenarios, it might be desirable to migrate instances out of a data center not affected by a failure and into a data center that is affected by the failure. For example, it might be desirable to migrate non-essential instances into an affected data center if the instance price were very low. It might also be desirable to create backup instances in a data center with a low probability of future unavailability. Other types of actions described below might also be taken based upon the computed instance availability information.

In some embodiments, the price charged by an operator of a distributed execution environment for instances of computing resources might be modified following the provision of instance availability information to a customer. For example, the price of instances might be decreased in order to encourage customers to migrate instances out of an affected data center. Alternately, the price of instances might be increased in order to discourage customers from migrating instances out of an affected data center. Other types of changes to the price charged for instances might also be made following the provision of instance availability information to a customer of a distributed execution environment.

The embodiments disclosed herein might be utilized to provide various types of useful information to customers of a distributed execution environment. For example, a customer might be notified that a certain group of instances have actually failed and are not just unreachable due to network issues. In this case the customer could replace the instances in response to receiving the information. In another scenario, a customer might be notified that a set of instances is operating with degraded redundancy and, as a result, is at an elevated risk of failure. The customer might then take appropriate action.

In another example, a customer might be notified which of their instances are most likely to fail in the future and which are least likely to fail. Using this information, a customer might reconfigure their instances in order to minimize the impact if an actual failure occurs. Other types of information might be provided and other types of customer action might also be taken. The information might also be utilized by an operator of the distributed execution environment to take various types of actions. Additional details regarding the various components and processes described briefly above for providing instance availability information in conjunction with instances provided by a distributed execution environment will be presented below with regard to FIGS. 1-11.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a computer system diagram providing an overview description of a mechanism disclosed herein for providing instance availability information, according to one embodiment presented herein. In one embodiment, the mechanism disclosed herein operates in conjunction with a network-based distributed execution environment 102 in which customers can purchase and utilize instances 104 of computing resources, such as a virtual machine instance 104A, on a permanent or as-needed basis. The distributed execution environment 102 may offer instances 104 of computing resources for purchase and use in various configurations. For example, the distributed execution environment 102 might offer virtual machine instances 104A available for purchase and use that have many different configurations of processor capabilities, main memory, disk storage, and operating system.

The distributed execution environment 102 might also offer instances 104B of other types of computing resources for purchase and use by customers. For example, the distributed execution environment 102 might offer data storage resources, networking resources, database resources, and other types of resources on a permanent or as needed basis. Instances of other types of resources might also be utilized including, but not limited to, instances of database resources, instances of data storage resources, instances of search resources instance of domain name service resources, instances of load balancing resources, instances of workflow resources, instances of application container resources, instances of electronic communication resources, instances of queuing resources, instances of notification resources, instances of caching resources, instances of identity and access management resources, instances of cryptographic resources, instances of content distribution resources, and instances of networking resources. The operator of the distributed execution environment 102 may charge a fee for operating some or all of these types of instances 104 to the customer that creates and uses the instances 104. Various pricing models that might be utilized to charge the customer for use of instances 104 of computing resources within the distributed execution environment 102 will be described below with regard to FIG. 4.

A customer or other user 108 of the distributed execution environment 102 might utilize a user computing system 110 connected to the distributed execution environment 102 by way of a WAN 112 to purchase, configure, and deploy various instances 104 provided by the distributed execution environment 102. For example, a customer might create, configure, and deploy various combinations of instances of computing resources to create a solution that provides certain functionality. For example, as mentioned above, a solution might provide functionality for application hosting, backup and/or storage, content delivery, Web hosting, enterprise IT solutions, database services, or another type of functionality. In the example shown in FIG. 1, a solution has been created that utilizes one or more virtual machine instances 104A and one or more instances 104B of other types of computing resources.

It should also be appreciated that the distributed execution environment 102 might provide other facilities for use by customers in conjunction with their instances 104. For example, the distributed execution environment 102 might provide facilities for automatically scaling instances 104 of computing resources in response to fluctuations in demand, various types of network functionality, such as domain name services ("DNS" services), and other functionality related to the operation of the instances 104. A customer might configure these various aspects of the distributed execution environment 102 appropriately for the operation of their particular application or solution.

It should also be appreciated that the distributed execution environment 102 might concurrently support many customers running a large number of instances. In order to provide this functionality at scale, the distributed execution environment 102 might be architected to utilize multiple data centers in multiple geographically disparate regions. One illustrative architecture for such a distributed execution environment 102 will be described below with respect to FIGS. 2 and 3.

As described briefly above, the embodiments disclosed herein include a mechanism for computing and providing instance availability information 114. The instance availability information 114 includes data identifying actual current failures of instances 104 of computing resources and the severity of the failures. The instance availability information 114 might also provide a probability of the future availability of instances 104 of computing resources. A customer or other user 108 of the distributed execution environment 102 might utilize the instance availability information 114 to reconfigure their instances 104 in view of an actual failure or the possibility of a failure. Additional details regarding the computation of the instance availability information 114 and its use will be provided below.

In one implementation, an instance availability monitoring component 118 is utilized to generate and provide the instance availability information 114. In order to compute the instance availability information 114, the instance availability monitoring component 118, or another component, collects operational status information 120 from components within the distributed execution environment 102 that are utilized to provide the instances 104 of computing resources. For example, operational status information 120 describing the current operational state of various hardware components like server computers, networking devices, cooling systems, and power systems utilized within the distributed execution environment 102 to provide the instances 104 might be collected. Operational status information 120 describing the current operational state of various software components utilized within the distributed execution environment 102 to provide the instances 104 might also be collected. Data might be collected from in-production components or from "canary" components configured to detect actual or potential problems within the distributed execution environment 102 and to provide operational status information 120 describing any detected issues.

The instance availability monitoring component 118 might also be configured to collect operational status information from an operator of the distributed execution environment 102. For example, the instance availability monitoring component 118 might collect data indicating the scheduled maintenance of software or hardware components that are utilized to provide instances 104 in the distributed execution environment 102. The instance availability monitoring component 118 might also be configured to collect information identifying the scheduled deployment of new software or firmware to components utilized to provide instances 104 in the distributed execution environment. The instance availability monitoring component 118 might also be configured to collect other types of data from other sources that might be relevant to the current or future availability of instances 104 of computing resources provided by the distributed execution environment 102. Additional details regarding aspects of the operation of the instance availability monitoring component 118 for collecting data 124 from sources within the distributed execution environment 102 will be described below with regard to FIG. 6.

As shown in FIG. 1, the instance availability monitoring component 118 might also be configured in some embodiments to collect data from one or more external data sources 122. For example, the instance availability monitoring component 118 might be configured to collect external data 124 from the external data sources 122 that may be relevant to a determination of a probability of a future failure of instances 104 provided by the distributed execution environment 102. As one example, the instance availability monitoring component 118 might be configured to collect weather forecasts for a geographic area that includes a data center that provides the instances 104. Similarly, the instance availability monitoring component 118 might collect information from utility providers, such as power, gas, and data networking providers. This data might be indicative of a future failure of a utility provider and, therefore, might also be collected by the instance availability monitoring component 118 and utilized to compute a future probability of a failure of instances 104 provided by the distributed execution environment 102. Additional details regarding aspects of the operation of the instance availability monitoring component 118 for collecting data 124 from external data sources 122 will be described below with regard to FIG. 7.

It should be appreciated that the data collection operations described above may be performed on a regular, continual, and on-going basis, so that the instance availability monitoring component 118 has access to up-to-date operational status information 120 and other information regarding the current and future availability of instances. In this way, and as will be described in greater detail below, the instance availability monitoring component 118 can provide access to the instance availability information 114 for instances 104 to customers and other users 108 of the distributed execution environment 102 in real time or in near real time.

In order to compute the instance availability information 114 for one or more instances 104, the instance availability monitoring component 118 might utilize some or all of the collected data described above. The instance availability monitoring component 118 might compute the instance availability information 114 in advance of receiving a request 116 for the instance availability information 114. Alternately, the instance availability monitoring component 118 might compute the instance availability information 114 in response to a request 116 for the information. For example, a user 108 might utilize the user computing system 110 to submit a request 116 for the instance availability information 114 for a particular instance 104 for a particular time period in the future. In response to receiving the request 116, the instance availability monitoring component 118 might compute the requested instance availability information 114 and provide the computed result in response to the request 116. The request 116 might be submitted to the instance availability monitoring component 118 via a suitable API or via another mechanism.

According to various embodiments, the instance availability monitoring component 118 might compute and provide the instance availability information 114 on a per customer basis, per instance basis, per data center basis, per region basis, or on another basis. For example, a customer might be provided with instance availability information 114 indicating the probability of availability during a certain period of time for all of the instances 104 that the customer has purchased. As another example, a customer might be provided with information describing the probability that a particular instance 104 will be available during some future time period.

According to various embodiments, the instance availability information 114 might be provided to users 108 of the distributed execution environment 102 in real-time or in near real-time. In some embodiments, a delay might be imposed prior to provision of the instance availability information 114 to users 108 of the distributed execution environment 102. The instance availability information 114 might be provided by way of a "pull" mechanism, such as a Web services API, or a "push" mechanism such as e-mail or SMS messages. Other mechanisms might also be utilized to provide the computed instance availability estimate to customers and other users of a distributed execution environment 102. Additional details regarding aspects of the operation of the instance availability monitoring component 118 for providing the instance availability information 114 to interested parties will be described below with regard to FIG. 8.

According to embodiments, various types of manual or automated actions might also be taken with regard to instances 104 of computing resources based upon the computed instance availability information 114 for the instances 104. For example, instances 104 of computing resources might be migrated out of a data center affected by a failure and into a data center that is not affected by the failure. In other scenarios, it might be desirable to migrate instances 104 out of a data center not affected by a failure and into a data center that is affected by the failure. For example, it might be desirable to migrate non-essential instances 104 into an affected data center if the instance price were very low. It might also be desirable to create backup instances 104 in a data center with a low probability of future unavailability. Other types of actions described below might also be taken based upon the computed instance availability information 114. Details regarding some of the various types of actions that might be taken will be provided below with regard to FIG. 9.

In some embodiments, the price charged by an operator of the distributed execution environment 102 for the use of instances 104 of computing resources might be modified following the provision of instance availability information 114 to a customer. For example, the price of instances 104 might be decreased in order to encourage customers to migrate instances out of an affected data center. Alternately, the price of instances might be increased in order to discourage customers from migrating non-essential instances out of an affected data center. Other types of changes to the price charged for instances might also be made following the provision of instance availability information to a customer of a distributed execution environment 102. Additional details regarding various types of modifications that might be made to the pricing structure for instances 104 of computing resources provided by a distributed execution environment 102 following the provision of instance availability information 114 will be provided below with regard to FIG. 10.

In some implementations, the availability monitoring component 118 might be configured to provide reduced functionality in the event of the failure or performance degradation of systems, software, or devices that provide the availability monitoring component 118. For example, in the event of a failure, the availability monitoring component 118 might provide less customer-specific data and, instead, provide more static data regarding the future availability of instances in the distributed execution environment 102. The availability monitoring component 118 might also provide other types of reduced functionality in response to a failure condition.

Figure 2:
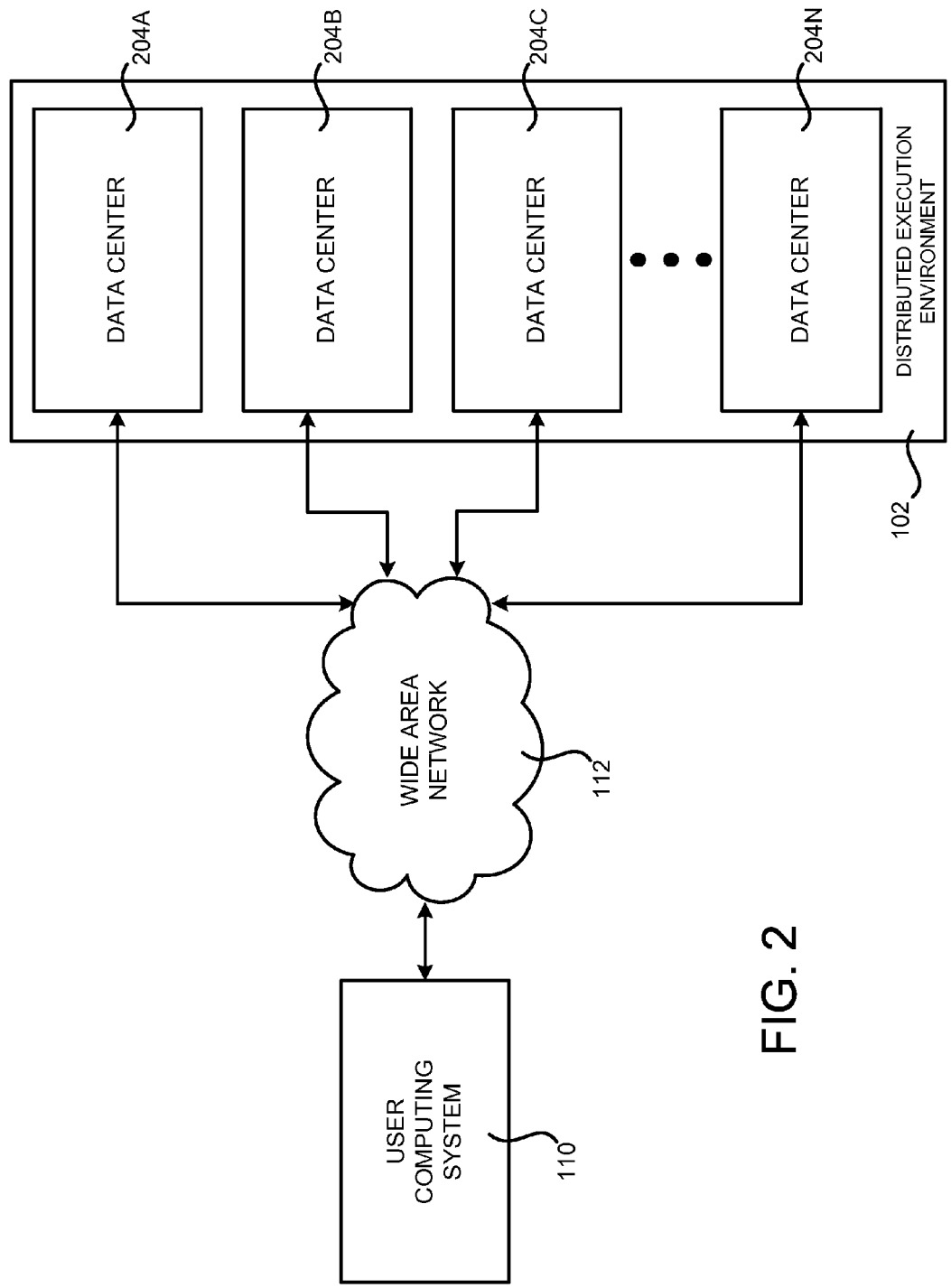
FIG. 2 is a system and network diagram that shows one illustrative operating environment for the embodiments disclosed herein that includes a distributed execution environment.

FIG. 2 and the following description are intended to provide a brief, general description of a suitable computing environment in which the embodiments described herein may be implemented. In particular, FIG. 2 is a system and network diagram that shows an illustrative operating environment that includes a distributed execution environment 102 capable of providing instances 104 of computing resources in the manner disclosed herein. The distributed execution environment 102, or other components executing in conjunction with the distributed execution environment 102, might also provide the functionality disclosed herein for providing instance availability information 114.

As discussed briefly above, the distributed execution environment 102 can provide instances of computing resources on a permanent or an as-needed basis. The instances of computing resources provided by the distributed execution environment 102 may include various types of resources, such as data processing resources, data storage resources, networking resources, data communication resources, and the like. Each type of computing resource may be general-purpose or may be available in a number of specific configurations. For example, and as will be described in greater detail below, instances of data processing resources may be available as virtual machine instances 104A in a number of different configurations. The virtual machine instances 104A may be configured to execute applications, including Web servers, application servers, media servers, database servers, and other types of applications. Instances of data storage resources may include file storage devices, block storage devices, and the like.

Each type or configuration of an instance 104 of a computing resource may be available in different sizes, such as large resources, consisting of many processors, large amounts of memory, and/or large storage capacity, and small resources consisting of fewer processors, smaller amounts of memory, and/or smaller storage capacity. Additional details regarding the various types of resources offered by the distributed execution environment 102 will be provided below with regard to FIG. 4.

The instances of computing resources provided by the distributed execution environment 102 are enabled in one implementation by one or more data centers 204A-204N (which may be referred to herein singularly as "a data center 204" or in the plural as "the data centers 204"). The data centers 204 are facilities utilized to house and operate computer systems and associated components. The data centers 204 typically include redundant and backup power, communications, cooling, and security systems. The data centers 204 might also be located in geographically disparate locations. One illustrative configuration for a data center 204 that implements the concepts and technologies disclosed herein for providing instance availability information 114 will be described below with regard to FIG. 3.

The customers and other users 108 of the distributed execution environment 102 may access the computing resources provided by the data centers 204 over a WAN 112. Although a WAN 112 is illustrated in FIG. 2, it should be appreciated that a local-area network ("LAN"), the Internet, or any other networking topology known in the art that connects the data centers 204 to remote customers and other users may be utilized. It should also be appreciated that combinations of such networks might also be utilized.

Figure 3:
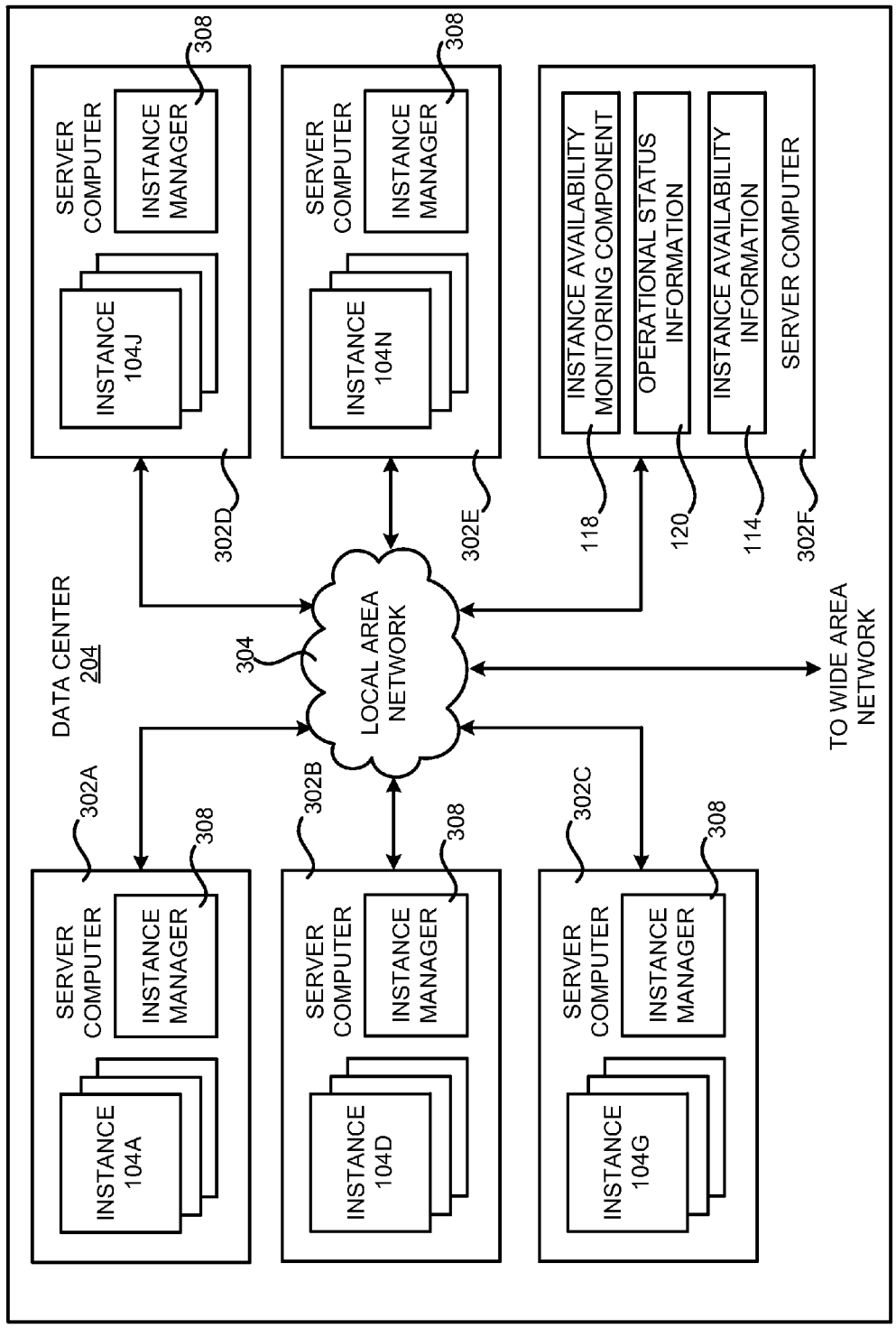
FIG. 3 is a computing system diagram that illustrates one configuration for a data center that implements aspects of the concepts and technologies disclosed herein for providing availability information for instances of computing resources provided by a distributed execution environment, according to one embodiment disclosed herein.

FIG. 3 is a computing system diagram that illustrates one configuration for a data center 204 that might be utilized to implement aspects of the distributed execution environment 102, including the some or all of the concepts and technologies disclosed herein for providing instance availability information 114. The example data center 204 shown in FIG. 3 includes several server computers 302A-302F (which may be referred to herein singularly as "a server computer 302" or in the plural as "the server computers 302") for providing instances 104 of computing resources. The server computers 302 may be standard tower or rack-mount server computers configured appropriately for providing the computing resources described herein. For example, in one implementation the server computers 302 are configured to provide instances 104A-104N of computing resources.

In one embodiment, some of the instances 104A-104N (which may be referred to herein singularly as "an instance 104" or in the plural as "the instances 104") are virtual machine instances. As known in the art, a virtual machine instance is an instance of a software implementation of a machine (i.e. a computer) that executes programs like a physical machine. Each of the servers 302 may be configured to execute an instance manager 308 capable of instantiating and managing instances of computing resources. In the case of virtual machine instances, for example, the instance manager 308 might be a hypervisor or another type of program configured to enable the execution of multiple virtual machine instances 104 on a single server 302, for example. Other types of instance managers 308 might be used with other types of instances 104.

The data center 204 shown in FIG. 3 also includes a server computer 302F reserved for executing software components for managing the operation of the data center 204, the server computers 302, and the instances 104. In particular, the server computer 302F might execute the instance availability monitoring component 118 to collect operational status information 120 and generate the instance availability information 114. Details regarding the operation of each of the instance availability monitoring component 118 will be provided below. In this regard, it should be appreciated that while this component is illustrated as executing within the distributed execution environment 102, computing systems that are external to the distributed execution environment

102 might be utilized to execute this component. Other configurations might also be utilized.

In the example data center 204 shown in FIG. 3, an appropriate LAN 304 is utilized to interconnect the server computers 302A-302E and the server computer 302F. The LAN 304 is also connected to the WAN 112 illustrated in FIG. 2. It should be appreciated that the configuration and network topology illustrated in FIGS. 1-3 has been greatly simplified and that many more computing systems, networks, and networking devices may be utilized to interconnect the various computing systems disclosed herein. Appropriate load balancing devices or software modules might also be utilized for balancing a load between each of the data centers 204A-204N, between each of the server computers 302A-302F in each data center 204, and between instances 104 of computing resources purchased by each customer of the distributed execution environment 102.

It should be appreciated that the data center 204 described in FIG. 3 is merely illustrative and that other implementations might be utilized. In particular, functionality described herein as being performed by the instance availability monitoring component 118 might be performed by other components, or might be performed by a combination of components, or by components arranged in another configuration not explicitly described herein. Additionally, it should be appreciated that the functionality described herein might be implemented in software, hardware, or a combination of software and hardware. Other implementations should be apparent to those skilled in the art.

Figure 4:
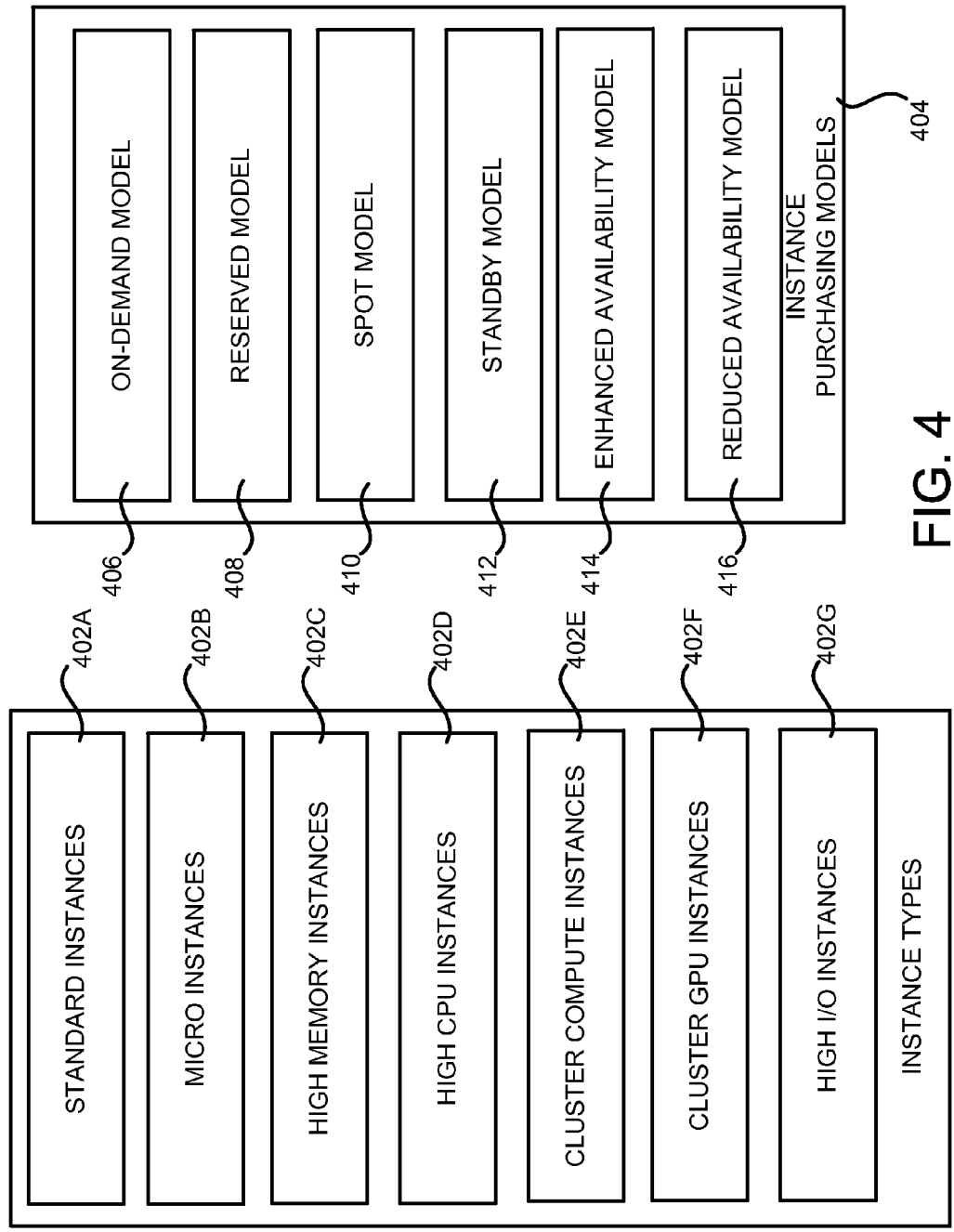
FIG. 4 is a block diagram showing aspects of various instance types and instance purchasing models that might be provided through a distributed execution environment and utilized in embodiments disclosed herein.

FIG. 4 is a block diagram illustrating several types of instances 104 of computing resources, along with several purchasing models that might be utilized to set the price for instances 104, available within the distributed execution environment 102, according to embodiments disclosed herein. As described briefly above, the instances of computing resources provided by the distributed execution environment 102, such as virtual machine instances 104A, may be made available to customers of the distributed execution environment 102 in a number of different types, or configurations. The example instance types shown in FIG. 4 indicates that the following instance types are available for use within the distributed execution environment 102: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances are instances 104 that are configured with generally proportional amounts of CPU and memory. Standard instances may be suitable for common computing applications. Standard instances may be made available in various sizes in some embodiments. For example, "small", "medium", "large", and "extra large" instances may be made available, with each of these instances having greater amounts of CPU and memory, while maintaining approximately similar ratios of CPU to memory.

Micro instances are instances 104 that provide a small amount of consistent CPU resources and allow CPU capacity to be increased in short bursts when additional cycles are available. Micro instances may be suited for lower throughput applications and Web sites that require additional compute cycles periodically.

High memory instances are instances 104 that have proportionally more random access memory ("RAM") resources than CPU resources. High memory resources are suitable for high throughput applications, including database and memory caching applications. For example, various types of high memory instances might offer between 17.1 and 68.4 GB of RAM in embodiments disclosed herein. Larger main memory sizes might also be made available to customers of the distributed execution environment 102. In contrast, high CPU virtual machine instances 104 have proportionally more CPU resources than RAM memory resources and are well suited for compute-intensive applications.

Cluster compute instances are instances 104 that offer proportionally high CPU resources with increased network performance. Cluster compute instances are well suited for High Performance Compute ("HPC") applications and other demanding network-bound applications. Cluster GPU instances are virtual machine instances 104 that provide general-purpose GPUs with proportionally high CPU and increased network performance for applications benefitting from highly parallelized processing, including HPC, rendering and media processing applications. While cluster compute instances provide the ability to create clusters of instances connected by a low latency, high throughput network, cluster GPU instances provide an additional option for applications that can benefit from the efficiency gains of the parallel computing power of GPUs over what can be achieved with traditional processors.

High I/O instances are instances 104 that provide very high disk I/O performance and are ideally suited for many high performance database workloads. High I/O instances may utilize solid state-drive ("SSD")-based local instance storage for high I/O throughput. High I/O instances might also provide high levels of CPU, memory, and network performance.

It should be appreciated that the various instance types described above with regard to FIG. 4 are merely illustrative. Other instance types not described explicitly might also be utilized with the various concepts and technologies described herein. Additionally, in some embodiments, virtual machine instances 104A may be made available in various sizes having continuous ratios of CPU to memory.

It should also be appreciated that the various instance types described above might also be utilized with various operating systems. For example, a customer of the distributed execution environment 102 might request to execute a high CPU virtual machine instance executing the LINUX operating system. Similarly, a customer or other user of the of the distributed execution environment 102 might request to use a cluster compute instance executing the MICROSOFT WINDOWS SERVER operating system. Other operating systems might also be utilized.

As also shown in FIG. 4, the various instance types described above, and the other instance types described herein, might be priced according to various instance purchasing models 404. For example, as shown in FIG. 4, instances 104 of computing resources may be priced according to an on-demand model 406, a reserved model 408, a spot model 410, a standby model 412, an enhanced availability model 414, and a reduced availability model 416. Aspects of each of these instance purchasing models are described in greater detail below.

Instances of computing resources priced according to the on-demand model 406, which may be referred to herein as "regular" instances, are instances 104 that are paid for and in active use by a customer. The on-demand model 406 allows customers of the distributed execution environment 102 to pay for capacity per unit of time, such as an instance-hour, without requiring a long-term commitment. This may free the customer from the costs and complexities of planning, purchasing, and maintaining hardware and transforms what are commonly large fixed costs into much smaller variable costs.

Instances of computing resources priced according to the reserved model 408, which might be referred to herein as "reserved instances", are instances 104 of a computing resource that are reserved for a customer in exchange for a payment. The reserved model 408 provides a customer the option to make a one-time payment for each instance they want to reserve. In turn, the customer may receive a significant discount on the hourly usage charge for reserved instances as compared to on-demand instances. After the customer makes a one-time payment for reserved instances, the reserved instances are reserved for the customer and the customer has no further obligation. The customer may choose to run the reserved instances for the discounted usage rate for the duration of a chosen term. If the customer does not use the reserved instances, the customer will not pay usage charges on these instances.

The spot model allows customers to bid on unused capacity in the distributed execution environment 102. The customer can run the instances 104 priced according to the spot model, which may be referred to herein as "spot instances", for as long as their bid exceeds a current market price, called the spot instance market price. The spot instance market price may fluctuate based upon the supply of instances and the customer demand for the instances. Spot instances may be terminated if a customer's maximum bid no longer exceeds the current spot instance market price.

In order to obtain spot instances, a customer places a request for spot instances that specifies the desired number of spot instances and the maximum price the customer is willing to pay per instance hour. If the customer's maximum price bid exceeds the current spot instance market price for the spot instances, the customer's request will be fulfilled and the customer's spot instances will run until either the customer chooses to terminate them or the market price increases above the customer's maximum price (whichever is sooner). Various components operating within the distributed execution environment 102 may manage the market for the spot instances, including setting the current spot instance market price for the spot instances.

Instances of computing resources purchased according to the standby model 412, which might be referred to as "standby instances", are spot instances that have been acquired on behalf of a customer and that are made ready for near immediate use by the customer in the manner described herein. The price charged for standby instances is typically less than the price charged for on-demand instances, since the standby instances may be terminated in the same manner as spot instances. In one embodiment, standby instances are priced higher than spot instances and reserved instances, but lower than on-demand instances.

Instance of computing resources purchased according to the enhanced availability model 414 have a higher probability of future availability, as computed herein, than instances provided according to the other instance models described above. A premium might be charged for instances provided according to the enhanced availability model 414. In a similar fashion, instances of computing resources purchased according to the reduced availability model 416 have a lower probability of future availability than instances provided according to the other instance models described above. A discount might be provided for the purchase of instances according to the reduced availability model 416.

It should be appreciated that the various instance purchasing models 404 described above for on-demand instances, reserved instances, spot instances, and standby instances are merely illustrative and that other mechanisms may be utilized to set the pricing for the various instance types. It should also be appreciated that the embodiments disclosed herein may be utilized with any of the instance types and purchasing models 404 shown in FIG. 4 and other configurations of instances and purchasing models 404 not shown in FIG. 4. Additionally, it should be appreciated that instances of other types of computing resources might also be priced according to the instance purchasing models 404 shown in FIG. 4 or others. Moreover, the embodiments disclosed herein might also be utilized with other types of instances of computing resources, such as data storage resources, database resources, networking resources, and others. These resources might also be available in various configurations, capacities, arrangements, and priced according to various pricing schemes. As will be described in greater detail below with regard to FIG. 10, price charged for instances 104 of computing resources might be modified based upon the computed instance availability information 124 for the instances.

Figure 5:
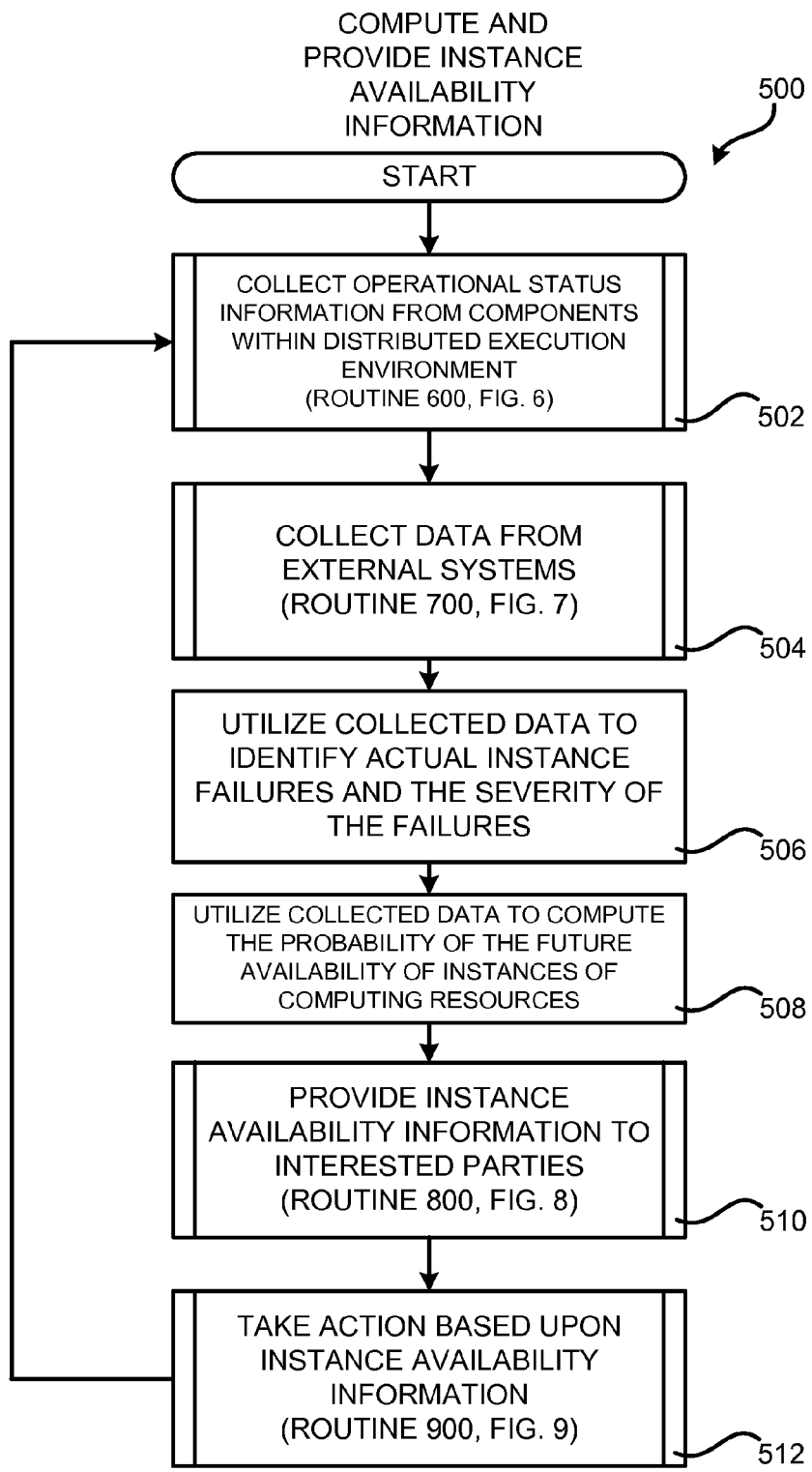
FIG. 5 is a flow diagram showing one illustrative routine that shows aspects of one mechanism disclosed herein for computing and providing availability information for instances of computing resources provided by a distributed execution environment, according to one embodiment disclosed herein.

FIG. 5 is a flow diagram showing one illustrative routine 500 that describes aspects of one mechanism disclosed herein for computing and providing instance availability information 114 for instances 104 of computing resources provided by a distributed execution environment 102, according to one embodiment disclosed herein. It should be appreciated that the logical operations described herein with respect to FIG. 5 and the other FIGS. are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 500 begins at operation 502, where the instance availability monitoring component 118 collects operational status information 120 from components within the distributed execution environment 102 that are utilized to provide instances 104 of computing resources. For example, the instance availability monitoring component 118 might collect operational status information 120 from server computers, networking devices, software components, power systems, backup power supplies, and other components within the distributed execution environment 102. The availability monitoring component 118 might also collect operational status information 120 and other information relevant to a determination of the availability of instances 104 from an operator of the distributed execution environment 102. Additional details regarding the collection of operational status information 120 from components within the distributed execution environment 102 will be provided below with regard to FIG. 6.

From operation 502, the routine 500 proceeds to operation 504, where the availability monitoring component 118 collects external data 124 from one or more external data sources 122. As discussed briefly above, the external data 124 may be relevant to a determination of a probability of a future failure of instances 104 provided by the distributed execution environment 102. For example, the instance availability monitoring component 118 might be configured to collect weather forecasts for a geographic area that includes a data center 204 that provides the instances 104. Similarly, the instance availability monitoring component 118 might collect information from utility providers, such as power, gas, and data networking providers. This data might be indicative of a future failure of a utility provider and, therefore, might also be collected by the instance availability monitoring component 118 and utilized to compute a future probability of a failure of instances 104 provided by the distributed execution environment 102. Additional details regarding aspects of the operation of the instance availability monitoring component 118 for collecting data 124 from external data sources 122 will be described below with regard to FIG. 7.

From operation 504, the routine 500 proceeds to operation 506, where the instance availability monitoring component 118 utilizes data collected at operations 502 and/or 504 to identify any actual instance failures within the distributed execution environment 102. If any actual instance failures are identified, the instance availability monitoring component 118 might also determine the severity of the failures. As mentioned above, this information might be computed in advance of receiving a request 116 or in response to receiving a request 116 for instance availability information 114. Additionally, and as will be described in greater detail below, this information might be provided to customers or other users 108 of the distributed execution environment 102 and utilized to take action with respect to instances 104 of computing resources. Moreover, this information might also be provided to software or hardware components and utilized to take action with respect to the instances 104 in an automated fashion.

From operation 506, the routine 500 proceeds to operation 508, where the instance availability monitoring component 118 utilizes data collected at operations 502 and/or 504 to compute the probability of future availability of one or more instances 104 executing within the distributed execution environment 102. This information might also be computed in advance of, or in response to, receiving a request 116 for the instance availability information 114. For example, a user 108 might submit a request 116 for the probability that a certain instance 104 will be available for use during a particular time period. In response to receiving such a request 116, the instance availability monitoring component 118 will compute the probability that the instance 104 will be available during the specified time period using some or all of the information collected at operations 502 and 504.

Once the instance availability monitoring component 118 has identified actual instance failures, the severity of the instance failures, and the probability of future availability of one or more instances 104, some or all of this information might be provided to a customer or other user 108 of the distributed execution environment 102 as the instance availability information 114. This occurs at operation 510 of the routine 500.

As discussed above, the instance availability information 114 information might be provided in advance of, or in response to, a request 116 for the instance availability information 114. As also discussed briefly above, this information might be provided by way of various mechanisms, such as through an API. Additional details regarding the various mechanisms described herein for providing the instance availability information 114 to one or more interested parties will be provided below with regard to FIG. 8.

From operation 510, the routine 500 proceeds to operation 512. At operation 512, a user 108 of the distributed execution environment 102 or a software or hardware component might take one or more actions based upon the instance availability information 114 provided at operation 510. For example, a user 108 might move instances 104 having a lower probability of future availability from a data center 204 affected by a problem to another data center 204 in the distributed execution environment 102 that is not affected. Other types of manual and automated actions might also be taken. Additional details regarding the various types of actions that will be taken will be provided below with regard to FIGS. 9 and 10.

From operation 512, the routine 500 proceeds back to operation 502, where the process described above may be repeated. By continually repeating this process, data identifying current failures or future potential failures within the distributed execution environment 102 may be identified. Additionally, appropriate action might be taken before an actual failure occurs, thereby minimizing the impact of such a failure. Additional details regarding these aspects will be provided below with regard to FIGS. 6-10.

Figure 6:
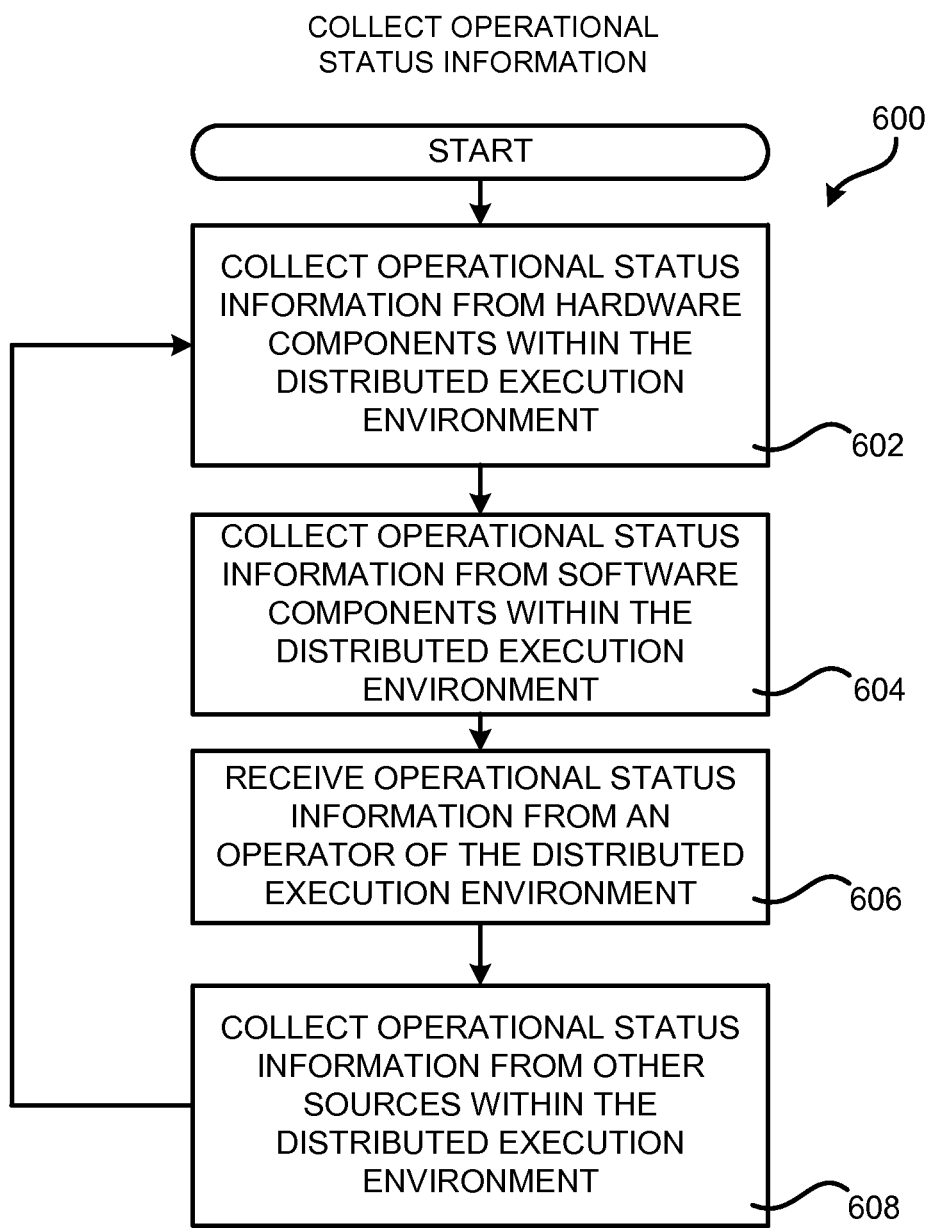
FIG. 6 is a flow diagram showing one illustrative routine that describes aspects of several mechanisms disclosed herein for collecting operational status information for components utilized to provide instances of computing resources in a distributed execution environment, according to embodiments disclosed herein.

FIG. 6 is a flow diagram showing one illustrative routine 600 that describes aspects of several mechanisms disclosed herein for collecting operational status information 120 for components utilized to provide instances 104 of computing resources in a distributed execution environment 102, according to embodiments disclosed herein. The routine 600 begins at operation 602, where the instance availability monitoring component 118 collects operational status information 120 from one or more hardware components within the distributed execution environment 102 utilized to provide instances 104 of computing resources.

As mentioned above, the operational status information 120 describes the current operational status of the hardware devices including, but not limited to, operational metrics and statistics, information identifying current and past failures, changes in operation (e.g. a switch to a backup generator) and other types of information indicating the operational state of the device. The operational status information 120 might also be indicative of a current failure or the potential of a future failure. For example, low voltage levels output from a power supply might be indicative of a future failure of the power supply. Likewise, a network device experiencing high levels of packet loss, increased ping times, increased latencies and/or other issues might be indicative of a future failure of the network device.

The instance availability monitoring component 118 might collect data from virtually any device within the distributed execution environment 102. For example, and without limitation, the operational status information 120 might be collected from desktop and server computers, networking devices, power supplies and other power-related components, cooling devices, backup power supplies, generators, and other backup-power related components. The operational status information 120 might be collected directly from devices configured to provide such information. Alternately, the operational status information 120 might be collected from devices configured to monitor the operation of other devices.

As mentioned briefly above, the operational status information 120 might be collected from components that are operated within the distributed execution environment 102 to provide actual instances 104 of computing resources. In other embodiments, however, the operational status information 120 might be collected from "canary" instances 104. Canary instances 104 are instances that have been created for the purpose of monitoring aspects of the operation of the distributed execution environment 102. For example, canary instances 104 might be created to monitor performance aspects of the distributed execution environment 102. Canary instances 104 might also be created to monitor other metrics that are indicative of current failures or the potential for future failures of components within the distributed execution environment 102. In some embodiments, production instances operating under the control of the owner or operator of the distributed execution environment 102 to provide production services may also serve as canary instances. Such instances may perform any task, including without limitation serving as a load balancer, a database instance, etc.

From operation 602, the routine 600 proceeds to operation 604, where the instance availability monitoring component 118 might also collect operational status information 120 from software components executing within the distributed execution environment 102. The software components might be components utilized to actually provide instances 104 of computing resources or other types of instances 104. For example, operational status information 120 might be collected from software executing in one or more virtual machine instances 104A executing within the distributed execution environment 102. Operational status information 120 might also be collected from the instance manager 308 and other types of software components configured to monitor aspects of the operation of the distributed execution environment 102. Operational status information 120 might also be collected from other types of software components executing within the distributed execution environment 102.

From operation 604, the routine 600 proceeds to operation 606 where operational status information 120 might also be received from a system operator in the distributed execution environment 102. For example, an appropriate interface might be provided through which an operator can submit information including, but not limited to, known actual failures or potential failures of components within the distributed execution environment 102, scheduled and/or unscheduled maintenance of hardware or software components within the distributed execution environment 102, scheduled and/or unscheduled software deployment within the distributed execution environment 102, weather events that might impact the operation of the distributed execution environment 102, the status of utility providers, historical data regarding actual failures and their causes, mean time between failures ("MTBF") information for components within the distributed execution environment 102, information regarding current and/or expected processing loads, and other information. As will be discussed in further detail below, some or all of this information might be utilized to compute the probability of future availability for instances 104 of computing resources within the distributed execution environment 102.

From operation 606, the routine 600 proceeds to operation 608, where operational status information 120 might be collected from other sources within the distributed execution environment 102 not explicitly identified above. The routine 600 then proceeds from operation 608 back to operation 602, described above, where the data collection process may be repeated. In this manner, operational status information 120 is continually collected regarding components within the distributed execution environment 102 that are utilized to provide instances 104 of computing resources. As will be described in greater detail with regard to FIG. 7, information relevant to the future availability of instances 104 within the distributed execution environment might also be collected from sources that are external to the distributed execution environment 102.

Figure 7:
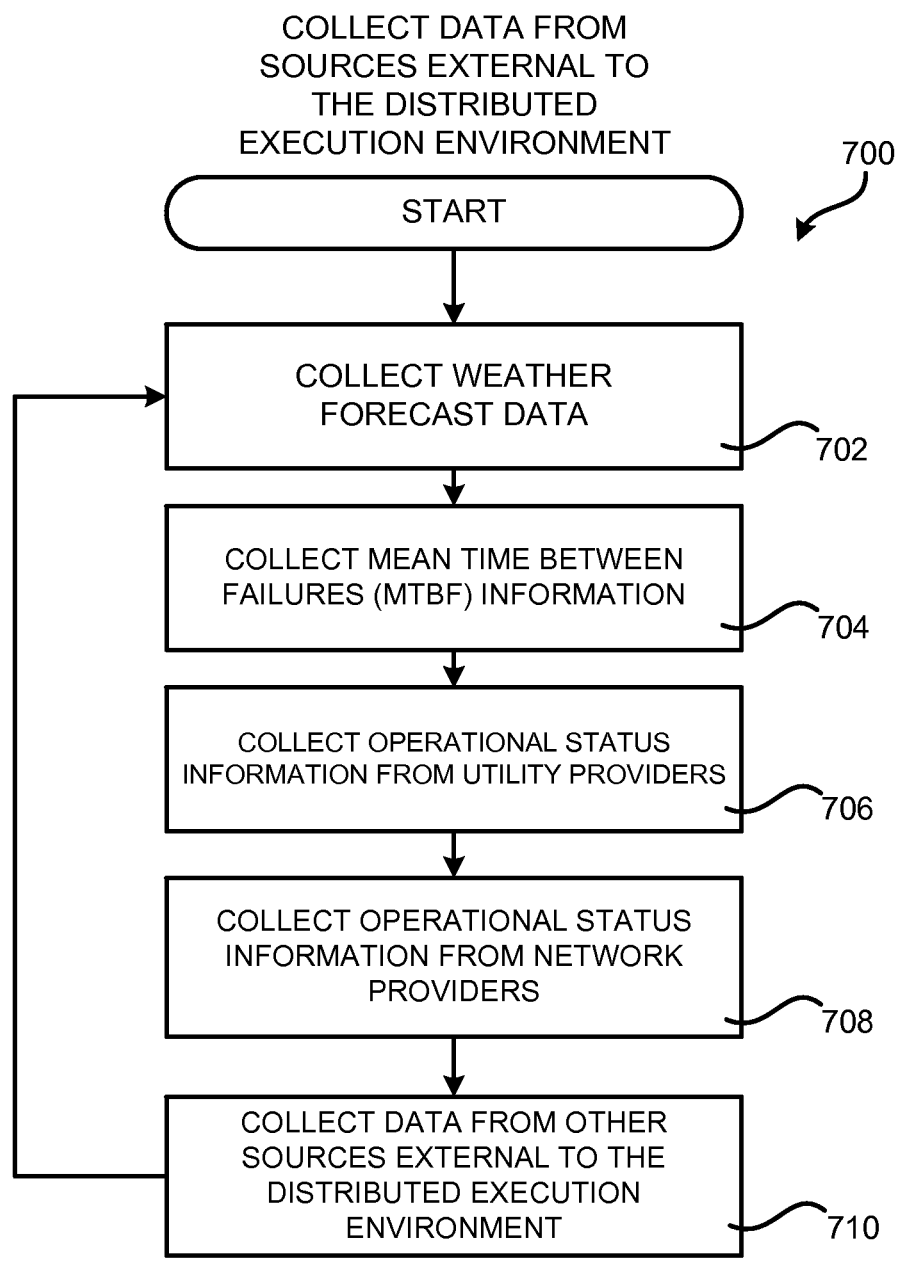
FIG. 7 is a flow diagram showing one illustrative routine that describes aspects of several mechanisms disclosed herein for collecting data from external sources that is relevant to a determination of a probability of future availability for instances of computing resources provided by a distributed execution environment, according to one embodiment disclosed herein.

FIG. 7 is a flow diagram showing one illustrative routine 700 that describes aspects of several mechanisms disclosed herein for collecting data 124 from external data sources 122 that is relevant to a determination of a probability of future availability for instances 104 of computing resources provided by a distributed execution environment 102, according to one embodiment disclosed herein. The routine 700 begins at operation 702, where the instance availability monitoring component 118 collects weather forecast data for the geographic area in which one or more of the data centers 204 or other facilities essential to the provision of services such as transit or utility providers are located. The weather forecast data might be collected from one or more external data sources 122 configured to update and provide this information. The weather forecast might be relevant to determination of the future availability of instances 104 of computing resources within the distributed execution environment 102.

From operation 702, the routine 700 proceeds to operation 704, where the instance availability monitoring component 118 collects MTBF information for hardware components within the distributed execution environment 102 utilized to provide instances 104 of computing resources. For example, a device manufacturer, wholesaler, or retailer might provide an external data source 122 for obtaining the MTBF information.

From operation 704, the routine 700 proceeds to operation 706, where the instance availability monitoring component 118 collects data 124 from one or more utility providers that service the data centers 204 of the distributed execution environment 102. For example, the availability monitoring component 118 might collect data 124 from an electrical or gas utility provider regarding the current and/or future status of the service provided by the utility. The data 124 might also indicate future events that might affect the availability of the service provided by the utility. As an example, the utility provider might provide information regarding future maintenance events, upgrades, weather events, or other types of events that might impact the ability of the utility provider to service the distributed execution environment 102.

From operation 706, the routine 700 proceeds to operation 708, where the instance availability monitoring component 118 collects data 124 from one or more data networking providers. For example, the availability monitoring component 118 might collect data 124 from a data networking provider regarding the current and/or future status of the data communications services provided by the provider. The data 124 might also indicate future events that might affect the availability of the data communications service provided by the provider. As an example, the data networking provider might provide information regarding future maintenance events, upgrades, weather events, or other types of events that might impact the ability of the data networking provider to provide data communications services to the data centers 204 that make up the distributed execution environment 102.

From operation 708, the routine 700 proceeds to operation 710, where the instance availability monitoring component 118 might collect data 124 from other sources external to the distributed execution environment 102 not explicitly identified above. The routine 700 then proceeds from operation 710 back to operation 702, described above, where the data collection process may be repeated. In this manner, data 124 that might be relevant to the future availability of instances 104 within the distributed execution environment 102 might be continually collected from sources 122 external to the distributed execution environment 102.

Figure 8:
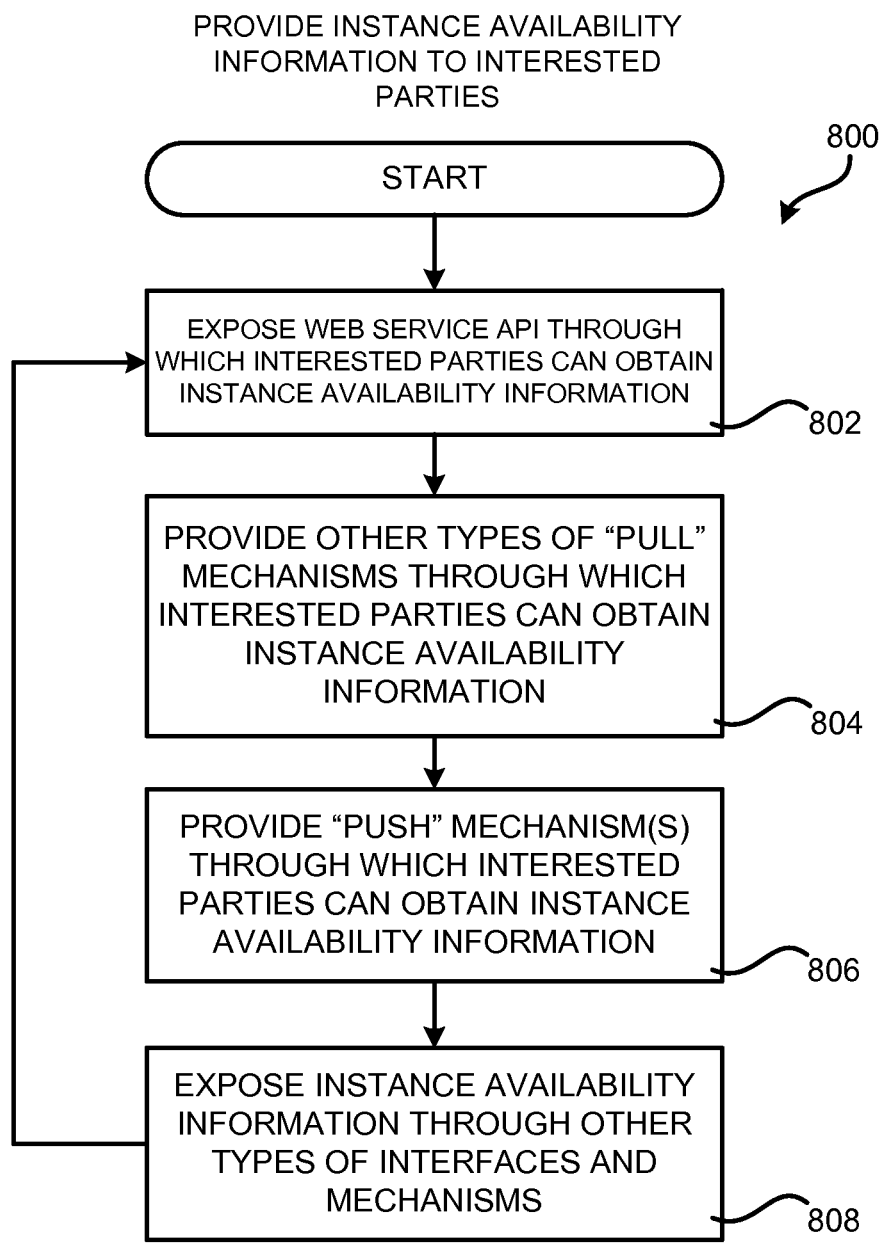
FIG. 8 is a flow diagram showing one illustrative routine that describes aspects of several mechanisms disclosed herein for providing instance availability information to interested parties, according to one embodiment disclosed herein.

FIG. 8 is a flow diagram showing one illustrative routine 800 that describes aspects of several mechanisms disclosed herein for providing instance availability information 114 to interested parties, according to one embodiment disclosed herein. As mentioned briefly above, interested parties include, but are not limited to, customers of the distributed execution environment 102, administrators and other users of the distributed execution environment 102, program components configured to consume the instance availability information 114, and potentially other users, components, systems, and consumers.

The routine 800 begins at operation 802, where the instance availability monitoring component 118, or another component, exposes a Web service or other type of API through which interested parties can obtain the instance availability information 114. For example, an interested party might submit a request 116 for the instance availability information 114 for an instance, or group of instances, to the instance availability monitoring component 118 by way of a Web services API. In response thereto, the instance availability monitoring component 118 might retrieve or compute the requested instance availability information 114 and provide the information in response to the request 116. In this way, a customer or other user of the distributed execution environment 102 can obtain information regarding the actual failure of one or more instances 104, the severity of the failure, and the probability that an instance 104 will be available at a future point or period in time.

According to various embodiments, the instance availability information 114 might be exposed in various ways. For example, a customer of the distributed execution environment 102 might be permitted to obtain instance availability information 114 only for instances that they have purchased. In this way, the instance availability information 114 might be exposed on a per customer basis. The instance availability information 114 might also be exposed on a per instance basis, a per group of instances basis, a per data center basis, a per region basis, a per server basis, a per rack basis, a per pod basis, per room of servers basis, or based upon another subdivision. The instance availability information 114 might also be limited to a certain group of customers of the distributed execution environment 102, such as customers doing a high volume of business or customers that are particularly technically savvy.

In some embodiments, the instance availability information 114 might include detailed information regarding a failure or probability of failure of one or more instances 104. For example, the probability of availability of an instance 104 may be computed as 95% at some future point in time due to a hurricane forecasted for the geographic area of a data center 204 in the distributed execution environment 102. In this example, the instance availability information 114 might provide one or more reasons (i.e. weather conditions such as a hurricane) as to why the availability of the instance 104 is less than 100%. Other reasons relating to specific actual or predicted hardware failures, utility failures, network failures or other types of failures might also be provided.

From operation 802, the routine 800 proceeds to operation 804, where the instance availability monitoring component 118 might also provide other types of "pull" mechanisms through which customers or other users 108 of the distributed execution environment 102 can obtain the instance availability information 114. For example, a user 108 might utilize a console application or another type of graphical user interface ("GUI") provided by the instance availability monitoring component 118 or another component to obtain the instance availability information 114. Other types of application-based, Web-based, and mobile device-based user interfaces might also be provided through which a customer or other users 108 of the distributed execution environment 102 can obtain the instance availability information 114.

It should be appreciated that the probability of future availability might be expressed in various ways. For example, the probability of future availability might be expressed numerically as a percentage (e.g. an instance is 95% likely to be available during a particular time period). Alternately, the probability of future availability may be provided in the form of information usable to determine comparative reliability of pairs of instances. The probability of future availability might also be expressed as the probability of future unavailability (e.g. an instance is 5% likely to be unavailable during a particular time period). In this regard, the term availability might encompass partial unavailability as a result of a reduction in performance of instances. Accordingly, it should be appreciated that an instance might be wholly available, wholly unavailable, or partially unavailable due to a reduction in performance or another issue impacting performance.

It should also be appreciated that the instance availability information 114 might be presented in various ways when a GUI is utilized to present this information. For example, the instance availability information 114 might be presented as textual or graphical data. When presented graphically, the instance availability information 114 might be presented as indicators corresponding to instances or groups of instances. As an example, a graphical indicator might be presented in the color green to signify that the probability of future availability for an instance, or instances, is high. Similarly, a graphical indicator might be presented in the color red to signify that the probability of future availability for an instance, or instances, is low. Other types of graphical attributes might also be correlated to the computed probabilities and provided to customers of the distributed execution environment 102 in other ways.

From operation 804, the routine 800 proceeds to operation 806, where the instance availability monitoring component 118 might also provide one or more "push" mechanisms for providing the instance availability information 114 to customers and other users 108 of the distributed execution environment 102. For example, the instance availability monitoring component 118 might push the instance availability information 114 to interested parties by way of e-mail, SMS, social networking services, or other mechanisms where the transmission of the instance availability information 114 is initiated by the instance availability monitoring component 118 rather than by the interested party. In order to receive such notifications, an interested party might register in advance to receive instance availability information 114 for certain instances on a predetermined schedule, in response to the occurrence of certain events (e.g. the projected availability for an instance during a future time period falling below a certain value), or based upon other factors.

From operation 806, the routine 800 proceeds to operation 808, where other mechanisms other than those specifically described above might be utilized to provide the instance availability information 114 to interested parties. The routine 800 then proceeds from operation 808 back to operation 802, described above. In this way, the instance availability information 114 can be continually made available to interested parties by way of one or more of the mechanisms described above.

In some embodiments, the instance availability information is made available to interested parties in real time or in near real time. A customer of the distributed execution environment 102 might pay a premium to have near immediate access to the instance availability information 114. In other embodiments, a delay might be imposed on the availability of the instance availability information 114. For example, the information 114 might be made available a certain number of seconds, minutes, hours, or days after an instance failure has occurred. Customers of the distributed execution environment 102 might pay increasing amounts as the delay time is decreased. Other monetary and temporal restrictions might also be placed on the provision of the instance availability information 114 to interested parties.

In some embodiments, a customer might also be provided with correlated failure likelihoods for their instances 104 of computing resources. For example, a customer might request a correlated failure probability for two or more instances 104. Using the information collected above, the probability of a correlated failure of the identified resources might be computed and provided to the customer using one or more of the mechanisms described above. A customer might also be permitted to submit a list of instance identifiers and, in return, the customer will be provided with a list of the identifiers that has been re-ordered based upon the expected probability of availability of the instances for some future time period. A customer might utilize the ordered list to assign the referenced instances to various tasks. For example, an instance having a lower probability of future availability might be assigned to a less critical task than an instance with a higher probability of future availability.

Figure 9:
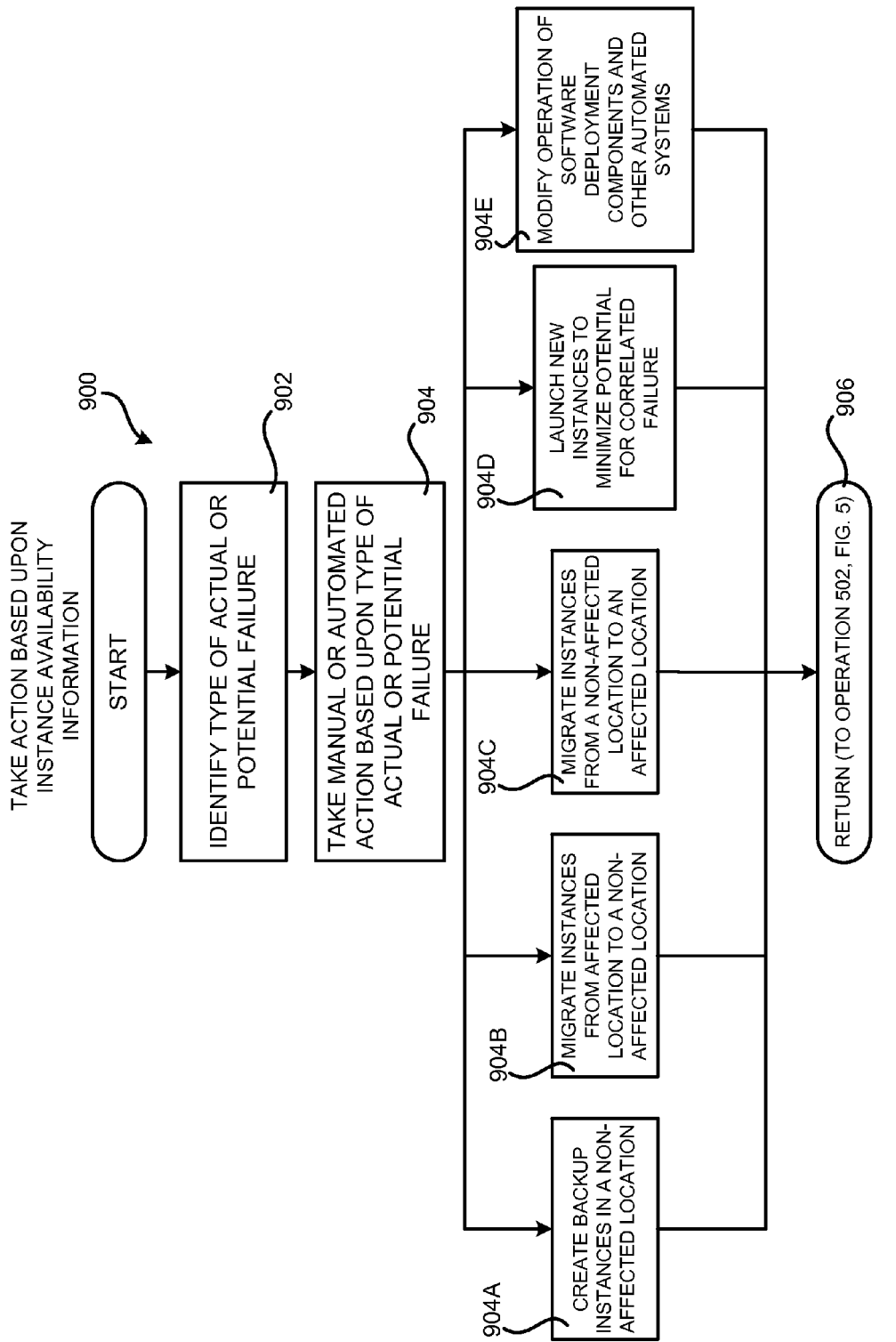
FIG. 9 is a flow diagram showing one illustrative routine that describes the operation of several mechanisms utilized in embodiments for taking action based upon received instance availability information for instances of computing resources provided by a distributed execution environment.

FIG. 9 is a flow diagram showing one illustrative routine 900 that describes the operation of several mechanisms utilized in embodiments for taking action based upon received instance availability information 114 for instances 104 of computing resources provided by a distributed execution environment 102. The routine 900 begins at operation 902, where the instance availability monitoring component 118, or another component, identifies a type of an actual instance failure or a potential failure. The type of failure or potential failure might be identified based upon the instance availability information 114 or other data. As will be described in greater detail below, different types of actions might be taken based upon the identified type of failure or potential for failure.

From operation 902, the routine 900 proceeds to operation 904, where various types of actions might be taken with respect to an identified failure or a potential for the failure of one or more instances 104 in the distributed execution environment 104. Operations 904A-904E, described below, illustrate several types of actions that might be taken in response to various types of failures or potential failures. It should be appreciated that these actions are merely illustrative and that many other types of actions might also be taken. Additionally, it should be appreciated that these actions might be taken manually, in response to commands received from customers or other users 108 of the distributed execution environment 102, or in an automated fashion by software or hardware components configured to respond to failures or potential failures of instances 104 in the distributed execution environment 102. For example, an autoscaling component might be configured in embodiments to take certain actions with respect to the scaling of instances up or down based upon the instance availability information 114. Other types of components might also be configured similarly.

At operation 904A, one or more backup instances 104 are created in a non-affected data center 204 or region. This type of action might be taken, for example, in response to receiving instance availability information 114 indicating that instances 104 in a particular data center 204 or region have a lower than normal probability of availability at some future point in time. By creating backup instances 104 in a non-affected region 204 or data center, the load served by the potentially affected instances 104 might be transferred immediate to the backup instances 104 in the event of an actual instance failure.

At operation 904B, one or more instances 104 are migrated from an affected data center 204 or region to a non-affected data center 204 or region. This type of action might also be taken in response to receiving instance availability information 114 indicating that instances 104 in a particular data center 204 or region have a lower than normal probability of availability at some future point in time. By migrating instances 104 out of an affected region or data center 204 to a non-affected region or data center 204, the impact of an actual instance failure might be avoided.

In some embodiments, an instance type is created and utilized that is automatically migrated out of an affected data center. The instance type might be configured to automatically migrate out of an affected data center when an actual failure occurs and/or when the probability of future availability of the instance drops below a certain percentage. An autoscaling device might be implemented with this functionality in some embodiments. Instances might also be migrated in other ways in response to other occurrences in other embodiments.

At operation 904C, one or more instances 104 are migrated from a non-affected data center 204 or region to an affected data center 204 or region. This type of action might also be taken in response to determining that instances 104 in a certain data center 204 or region have a lower than normal probability of availability at some future point in time. In this example, however, certain types of instances 104, such as instances performing non-essential processing tasks or storing non-essential data, might be migrated into an affected data center 204 or region in response to a discount in instance pricing offered by the operator of the distributed execution environment 102 or other motivating factor. In other embodiments, instances might be migrated out of the distributed execution environment 102 into another data center, or centers, or an on-premises computing facility operated by the customer of the distributed execution environment 102. An appropriate GUI might be provided that allows a customer to view information regarding the operational status of one or more distributed execution environments provided as a service, such as the distributed execution environment 102, and one or more on-premises customer-operated distributed execution environments. The GUI might also allow the customer to move instances of computing resources between each of these environments in an appropriate manner.

At operation 904D, new instances 104 might be launched in a manner designed to minimize the possibility of correlated failure with other affected instances. For example, new instances 104 might be launched in a non-affected rack, room, data center, or region in order to avoid a correlated failure of instances 104 belonging to the same customer of the distributed execution environment 102. New instances

104 might also be launched in other ways in order to minimize the possibility of a correlated failure.

At operation 904E, the operation of a software deployment component operating within the distributed execution environment 102 might be modified based upon the instance availability information 114. For example, if the information 114 indicates a number of instance failures, the software deployment component might be instructed to stage, throttle, or even defer new software deployments to a future time.

In some embodiments, a software deployment component might also utilize the instance availability information 114 to schedule deployment operations to minimize risk or cost. For example, the software deployment component might be configured to determine the required surplus capacity needed to handle software deployment in light of the instance availability information 114. The software deployment component might then modify the software deployment operations based upon the required surplus capacity. The operation of the software deployment component might also be modified in other ways based upon the instance availability information 114. The operation of other components within the distributed execution environment 102 might also be modified in a similar manner.

As indicated above, the actions illustrated at operations 904A-904E are merely illustrative and many other types of actions might also be taken based upon the instance availability information 114. For example, and without limitation, database instances and other resources might be moved away from data centers or regions hosting instances 104 having a decreased probability of future availability, database instances might be synchronized or mirrored to other instances outside a data center or region hosting instances 104 having a decreased probability of future availability, and instances might be pre-emptively shifted away from failing load balancers or other instances of networking resources identified as having an elevated risk of future failure.

Instances might also be moved, reconfigured, redeployed, migrated, quiesced, and otherwise modified in response to actual failures or potential failures identified in the instance availability information 114. For example, the configuration and/or type of instances in the distributed execution environment 102 might be modified based upon the instance availability information 114. As one specific example, excess capacity may exist in the form of virtual machine instances in the distributed execution environment 102. The configuration and/or type of these virtual machine instances might be modified in response to determining that the instance availability information 114 indicates the possibility of failure. For example, functionality performed by instances acting as masters or slaves might be reassigned. Other examples of actions that might be taken in response to actual failures or potential failures identified in the instance availability information 114 include, but are not limited to, re-weighted clients utilizing DNS or other configurations, moving workloads between providers, creating snapshots, backups, or performing other types of data replication activities, and protocols might be switched from performance oriented protocols to more fault resilient protocols. Other types of actions might also be taken.

The instance availability information 114 might also be utilized to queue or prioritize instance launch requests. For example, replacement instances for affected instances or customers might be prioritized. As another example, customers might be permitted to pay an extra fee for "premium" instances that are given priority for replacement following a failure. Instance launches for replacement instances for heavily affected customers might also be prioritized. As an alternative, instance launches for unaffected customers might also be prioritized. This alternative might be utilized to reduce the cascading failure effects resulting from customers evacuating a failing datacenter to cause a failure event to affect fewer customers. Instances launches might also be prioritized for customers that are not utilizing instances purchased at a discount. Using these mechanisms, instances can be launched in accordance with a priority based at least in part on the instance availability information associated with one or more other instances. Moreover, one or more of the actions described above might be selected based upon the expected cost of an outage expressed as an expected loss of revenue as a result of the unavailability of instances 104.

In some embodiments, the instance availability information 114 might also be utilized to satisfy a customer request to provide instances at a certain level of availability for a certain period of time. For example, a customer might be permitted to submit desired availability information along with a request to instantiate new instances of computing resources. The customer might provide a parameter to a "run instances" request that specifies a desired or required availability of the instances during one or more periods of time. The instance availability information 114 might then be utilized to configure the requested instances in a manner likely to meet the customer's stated availability requirements. In this way, a customer can request that instances be provided during a certain time period, or periods, at a specified level of availability. From operations 904A-904E, the routine 900 proceeds to operation 906, where it returns back to operation 502, described above with regard to FIG. 5.

Figure 10:
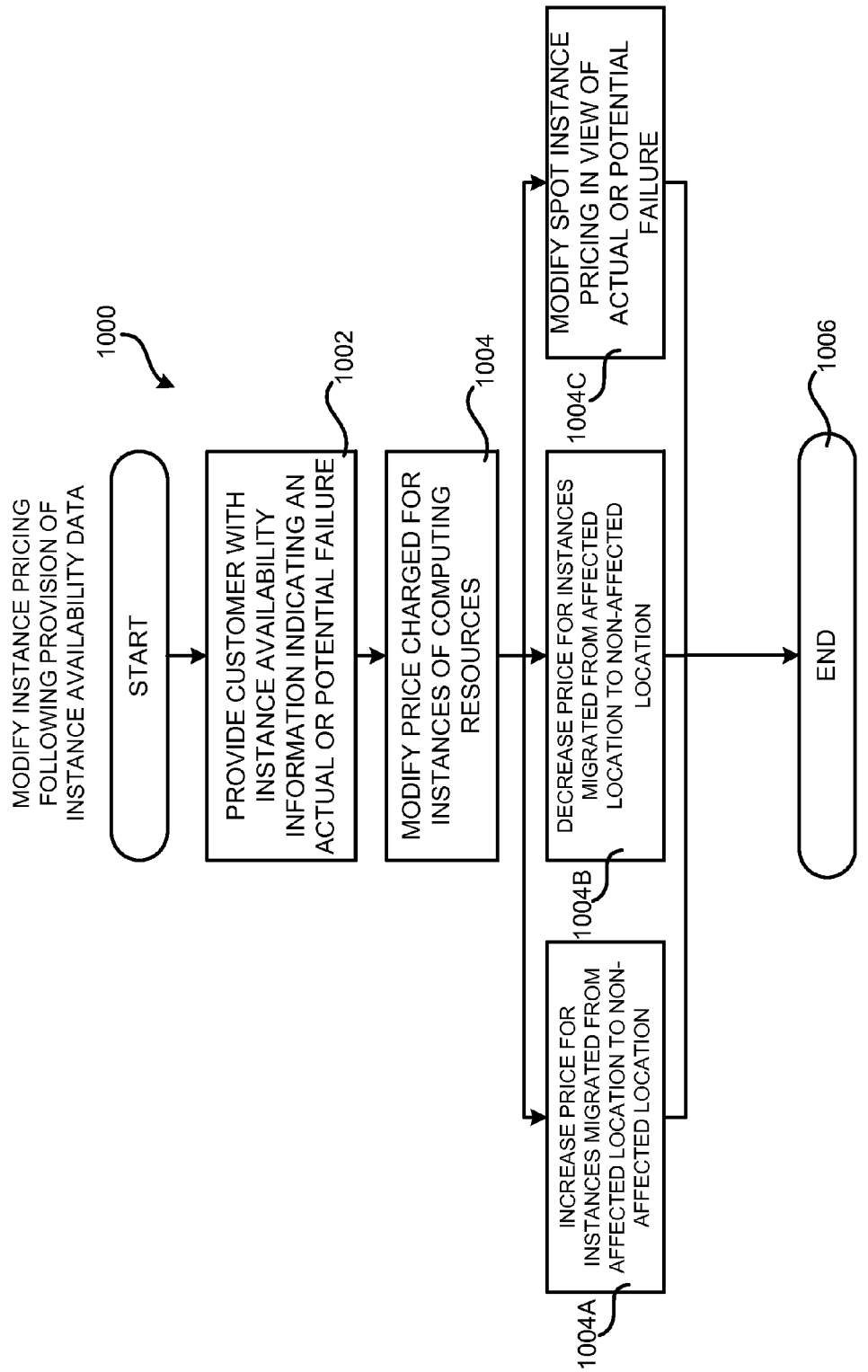
FIG. 10 is a flow diagram showing one illustrative routine for modifying the price charged for instances of computing resources following the provision of instance availability information for the instances, according to one embodiment disclosed herein.

FIG. 10 is a flow diagram showing one illustrative routine 1000 for modifying the price charged for instances 104 of computing resources following the provision of instance availability information 114 for the instances, according to one embodiment disclosed herein. The routine 1000 begins at operation 1002, where instance availability information 114 is provided to a customer of the distributed execution environment 102 that indicates the actual failure of one or more instances 104 or a reduced probability of availability of one or more instances 104.

From operation 1002 the routine 1000 proceeds to operation 1004, where the pricing charged to the customer for the instances 104 might be modified by the operator of the distributed execution environment 102 following the provision of the instance availability information 114 to the customer. Operations 1004A-1004C, described below, illustrate several types of modifications to instance pricing that might be made following the provision of the instance availability information 114 to the customer. It should be appreciated that these pricing modifications are merely illustrative and that the price for instances 104 might be modified in other ways after instance availability information 114 has been provided to a customer.

At operation 1004A, the price of instances 104 charged to a customer might be increased following the provision of instance availability information 114 to the customer. The price of instances 104 might be increased, for example, in order to discourage the customer from migrating the instances 104 out of an affected data center 204.

At operation 1004B, the price of instances 104 charged to a customer might be decreased following the provision of instance availability information 114 to the customer. The price of instances 104 might be decreased, for example, in order to encourage the customer to keep instances 104 in an affected data center 204. The price of instances 104 might also be decreased in order to encourage a customer to migrate non-essential instances 104 into an affected data center 204.

At operation 1004C, spot instance pricing might be modified in view of the instance availability information 114. As discussed above, a spot model might be utilized that allows customers to bid on unused capacity in the distributed execution environment 102. The customer can run spot instances for as long as the customer's bid exceeds the spot instance market price. The spot instance market price may fluctuate based upon the supply of instances and the customer demand for the instances. Spot instances may be terminated if a customer's maximum bid no longer exceeds the current spot instance market price. As shown in FIG. 10, spot instance pricing might be increased or decreased in view of an actual failure of one or more instances 104 or an increased probability of a future failure of one or more instances 104.

From operations 1004A-1004C the routine 1000 proceeds to operation 1006, where it ends. It should be appreciated that the operations described with regard to FIG. 10 are merely illustrative and that the price charged by an operator of the distributed execution environment 102 for instances 104 might be modified in other ways following the provision of the instance availability information 114 to a customer of the distributed execution environment 102.

In some implementations, customers might also be permitted to purchase new instances based upon the instance availability information 114. For example, a customer could submit a request to purchase, at a premium, one or more highly resilient instances 104 during a particular period of time. The instance availability information 114 computed in the manner above might be utilized to identify which instances 104 from a group of instances 104 are likely to be the most resilient to failure during the time specified by the customer. The instance availability information 104 might also be utilized to identify and provide instances 104 to customers that meet other types of requirements.

Figure 11:
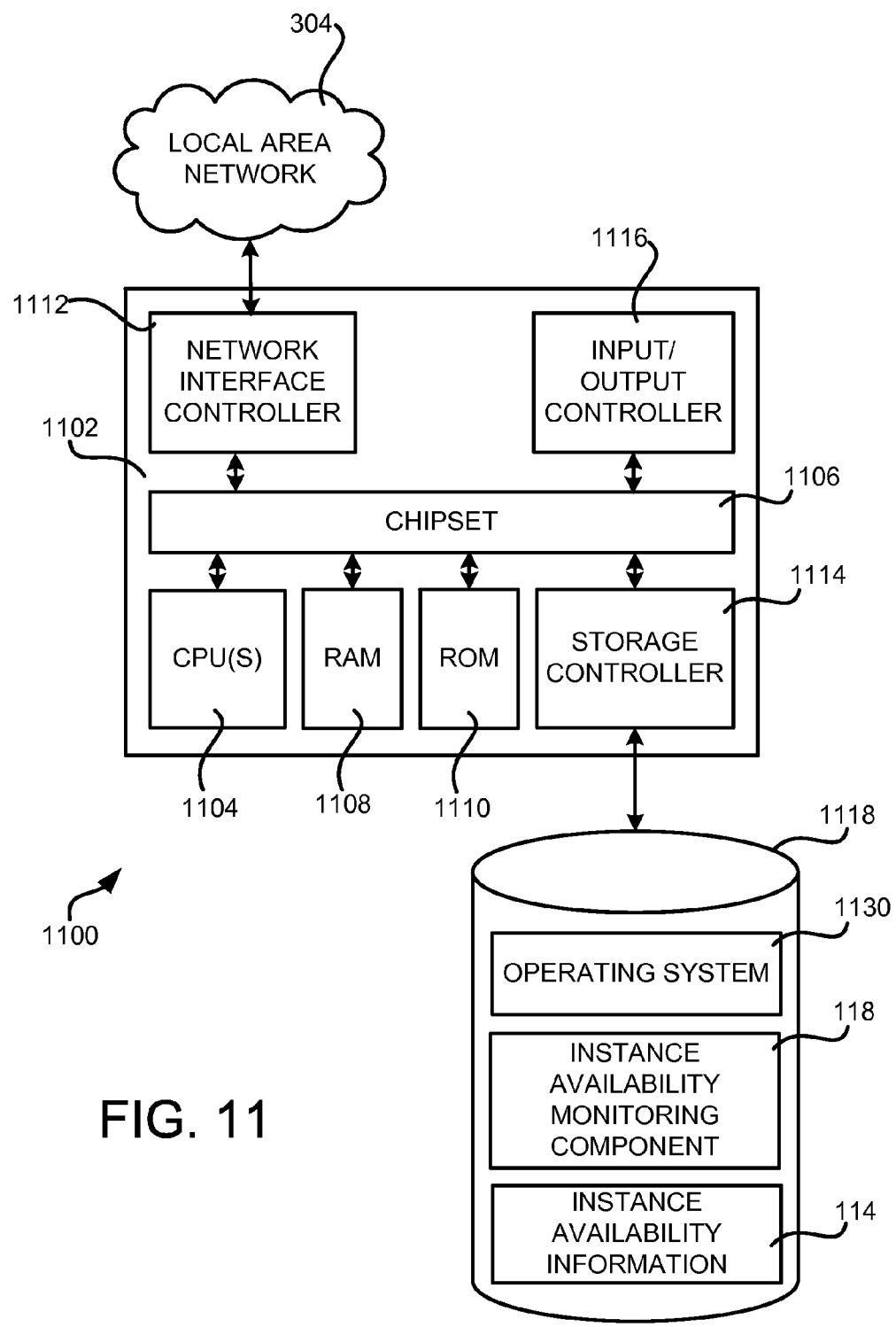
FIG. 11 is a computer architecture diagram showing one illustrative computer hardware architecture for implementing a computing device that might be utilized to implement aspects of the various embodiments presented herein.

FIG. 11 shows an example computer architecture for a computer 1100 capable of executing the program components described above for providing availability information 114 for instances 104 of computing resources implemented in a distributed execution environment 102. The computer architecture shown in FIG. 11 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing on the user computing system 110, within the data centers 204A-204N, on the server computers 302A-302F, or on any other computing system mentioned herein.

The computer 1100 includes a baseboard 1102, or "motherboard," which is a printed circuit board to which a multitude of components or devices may be connected by way of a system bus or other electrical communication paths. In one illustrative embodiment, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a random access memory ("RAM") 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the embodiments described herein.

The computer 1100 may operate in a networked environment using logical connections to remote computing devices and computer systems through a network, such as the local area network 304. The chipset 1106 may include functionality for providing network connectivity through a NIC 1112, such as a gigabit Ethernet adapter. The NIC 1112 is capable of connecting the computer 1100 to other computing devices over the network 304. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or secondary storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1130 utilized to control the operation of the computer 1100. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1118 may store other system or application programs and data utilized by the computer 1100, such as the instance availability monitoring component 118, the computed instance availability information 114 for one or more instance 104, and/or any of the other software components and data described above. The mass storage device 1118 might also store other programs and data not specifically identified herein.

In one embodiment, the mass storage device 1118 or other computer-readable storage media is encoded with computer-executable instructions which, when loaded into the computer 1100, transforms the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various routines described above with regard to FIGS. 5, 6, 7, 8, 9, and 10.

The computer 1100 may also include one or more input/output controllers 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11.

Based on the foregoing, it should be appreciated that technologies for providing instance availability information for instances provided by a distributed execution environment have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing information regarding the operational status of instances of computing resources provided by a distributed execution environment, the method comprising performing computer-implemented operations for:

collecting data from one or more sources within the distributed execution environment regarding the operational status of one or more components utilized to provide the instances of computing resources;

collecting data from one or more sources external to the distributed execution environment, the data collected from the one or more sources external to the distributed execution environment being relevant to a determination of a probability of a future failure of the instances of computing resources;

utilizing the data from the one or more sources within the distributed execution environment and the data from the one or more sources external to the distributed execution environment to generate instance availability information, the instance availability information comprising data identifying actual failures of the instances of computing resources, a severity of the failures of the instances of computing resources, and a probability of the future availability of the instances of computing resources;

providing the instance availability information to one or more users of the distributed execution environment; and taking one or more actions with regard to one or more of the instances of computing resources based upon the instance availability information and in response to one or more requests received from the one or more users, wherein the one or more actions comprise at least one of migrating the one or more of the instances of computing resources from a data center into another data center, migrating the one or more of the instances of computing resources out of the distributed execution environment, scaling up a number of instances of computing resources or scaling down the number of instances of computing resources, or performing one or more backup operations with respect to the one or more of the instances of computing resources.

2. The computer-implemented method of claim 1, wherein the one or more users comprise customers of the distributed execution environment, and wherein the instance availability information is provided on a per-customer basis.

3. The computer-implemented method of claim 1, wherein the components utilized to provide the instances of computing resources comprise hardware components.

4. The computer-implemented method of claim 1, wherein the components utilized to provide the instances of computing resources comprise software components.

5. The computer-implemented method of claim 1, wherein the data from one or more sources external to the distributed execution environment comprises a weather forecast for a geographic area that includes the instances of computing resources.

6. The computer-implemented method of claim 1, wherein the data from one or more sources external to the distributed execution environment comprises data collected from one or more utility providers servicing a geographic area that includes the instances of computing resources.

7. The computer-implemented method of claim 1, wherein the instance availability information is provided to the one or more users of the distributed execution environment through a Web service application programming interface ("APP").

8. The computer-implemented method of claim 1, wherein migrating one or more of the instances of computing resources from a data center into another data center comprises migrating the one or more of the instances of computing resources out of a data center affected by a failure and into a data center not affected by the failure.

9. The computer-implemented method of claim 1, wherein migrating one or more of the instances of computing resources from a data center into another data center comprises migrating the one or more of the instances of computing resources out of a data center not affected by a failure and into a data center affected by the failure.

10. The computer-implemented method of claim 1, further comprising modifying a price charged to a customer of the distributed execution environment for the instances of computing resources following provision of the instance availability information to the customer.

11. The computer-implemented method of claim 1, wherein the instances of computing resources comprise one or more of instances of virtual machines, instances of database resources, instances of data storage resources, instances of search resources instance of domain name service resources, instances of load balancing resources, instances of workflow resources, instances of application container resources, instances of electronic communication resources, instances of queuing resources, instances of notification resources, instances of caching resources, instances of identity and access management resources, instances of cryptographic resources, instances of content distribution resources, or instances of networking resources.

12. The computer-implemented method of claim 1, wherein less instance availability information is provided in response to detecting a failure of an instance availability monitoring component configured to provide the instance availability information.

13. A system for providing instance availability information, the system comprising:
one or more computer systems configured to provide a distributed execution environment; and
one or more computer systems configured to
collect data indicating the operational status of one or more components utilized to provide instances of computing resources in the distributed execution environment,
generate instance availability information based upon the data indicating the operational status of the one or more components, the instance availability information comprising data identifying one or more actual failures of the instances of computing resources and data indicating a probability of future availability of one or more of the instances of computing resources,
expose the instance availability information to one or more users of the distributed execution environment, and
perform one or more actions with regard to one or more of the instances of computing resources based upon the instance availability information, wherein the one or more actions comprise at least one of migrating the one or more of the instances of computing resources from a data center into another data center, migrating the one or more of the instances of computing resources out of the distributed execution environment, scaling up a number of instances of computing resources or scaling down the number of instances of computing resources, or performing one or more backup operations with respect to the one or more of the instances of computing resources.

14. The system of claim 13, wherein the instance availability information further comprises data identifying a severity of the failures of the instances of computing resources.

15. The system of claim 13, wherein the one or more computer systems configured to collect data are further configured to collect data from one or more sources external to the distributed execution environment for use in computing the probability of future availability of the instances of computing resources.

16. The system of claim 13, wherein the data indicating the operational status of the one or more components is collected from one or more canary instances in the distributed execution environment.

17. The system of claim 16, wherein the canary instances comprise production instances configured to provide functionality in the distributed execution environment.

18. The system of claim 13, wherein exposing the instance availability information to one or more users of the distributed execution environment comprises providing an application programming interface (API) for obtaining the instance availability information.

19. The system of claim 18, wherein the API is configured to provide the instance availability information on one or more of a per customer basis, a per instance basis, a per data center basis, or a per region basis.

20. The system of claim 13, further comprising one or more computer systems configured to receive instance launch requests and, in response thereto, to launch instances in accordance with a priority based at least in part on the instance availability information associated with one or more other instances.

21. The system of claim 13, further comprising one or more computer systems configured to receive instance launch requests, the launch requests containing information encoding a required availability within one or more periods of time, and, in response thereto, to launch instances using computing resources selected to be capable of providing availability based on the required availability.

22. The system of claim 13, wherein the collected data further comprises data based at least in part on planned software deployments or planned maintenance activities in the distributed execution environment.

23. The system of claim 13, wherein the availability information is comparative availability for a plurality of instances owned by a customer of the distributed execution environment.

24. A computer-readable storage medium having computer-executable instructions stored thereupon which, when executed by a computer, cause the computer to:
generate instance availability information that comprises data identifying one or more actual failures of one or more instances of computing resources and data indicating a probability that the one or more instances of computing resources in a distributed execution environment will be available during a future time period;
provide the instance availability information to a customer of the distributed execution environment for use in configuring the one or more instances of computing resources; and
perform one or more actions with regard to at least one of the one or more instances of computing resources based upon the instance availability information, wherein the one or more actions comprise one or more of migrating the at least one instance of computing resource from a data center into another data center, migrating the at least one instance of computing resource out of the distributed execution environment, scaling up a number of instances of computing resources or scaling down the number of instances of computing resources, or performing one or more backup operations with respect to the at least one instance of computing resource.

25. The computer-readable storage medium of claim 24, wherein the computer-readable storage medium has further computer-executable instructions stored thereupon which, when executed by a computer, cause the computer to modify a price associated with the instances of computing resources after the computed probability has been provided to the customer of the distributed execution environment.

26. The computer-readable storage medium of claim 24, wherein modifying a price associated with the instances of computing resources comprises modifying a price of one or more instances purchased and priced according to a spot pricing model.

27. The computer-readable storage medium of claim 24, wherein the probability is computed based upon data collected from components within the distributed execution environment and data collected from one or more sources external to the distributed execution environment.

28. The computer-readable storage medium of claim 27, wherein the data collected from one or more sources external to the distributed execution environment comprises at least one of a weather forecast for a geographic area that includes the instances of computing resources or data collected from one or more utility providers servicing the geographic area that includes the instances of computing resources.

* * * * *